INVENTORS
MILO O. RUDD
ALEXANDER M. WORONOFF
BY
Kane, Dalsimer & Kane
ATTORNEYS

March 11, 1969 M. O. RUDD ET AL 3,431,688
METHOD FOR PROCESSING OF OPHTHALMIC LENS
Filed Feb. 4, 1965 Sheet 2 of 15

INVENTORS
MILO O. RUDD
ALEXANDER M. WORONOFF
BY
Kane, Dalsimer & Kane
ATTORNEYS

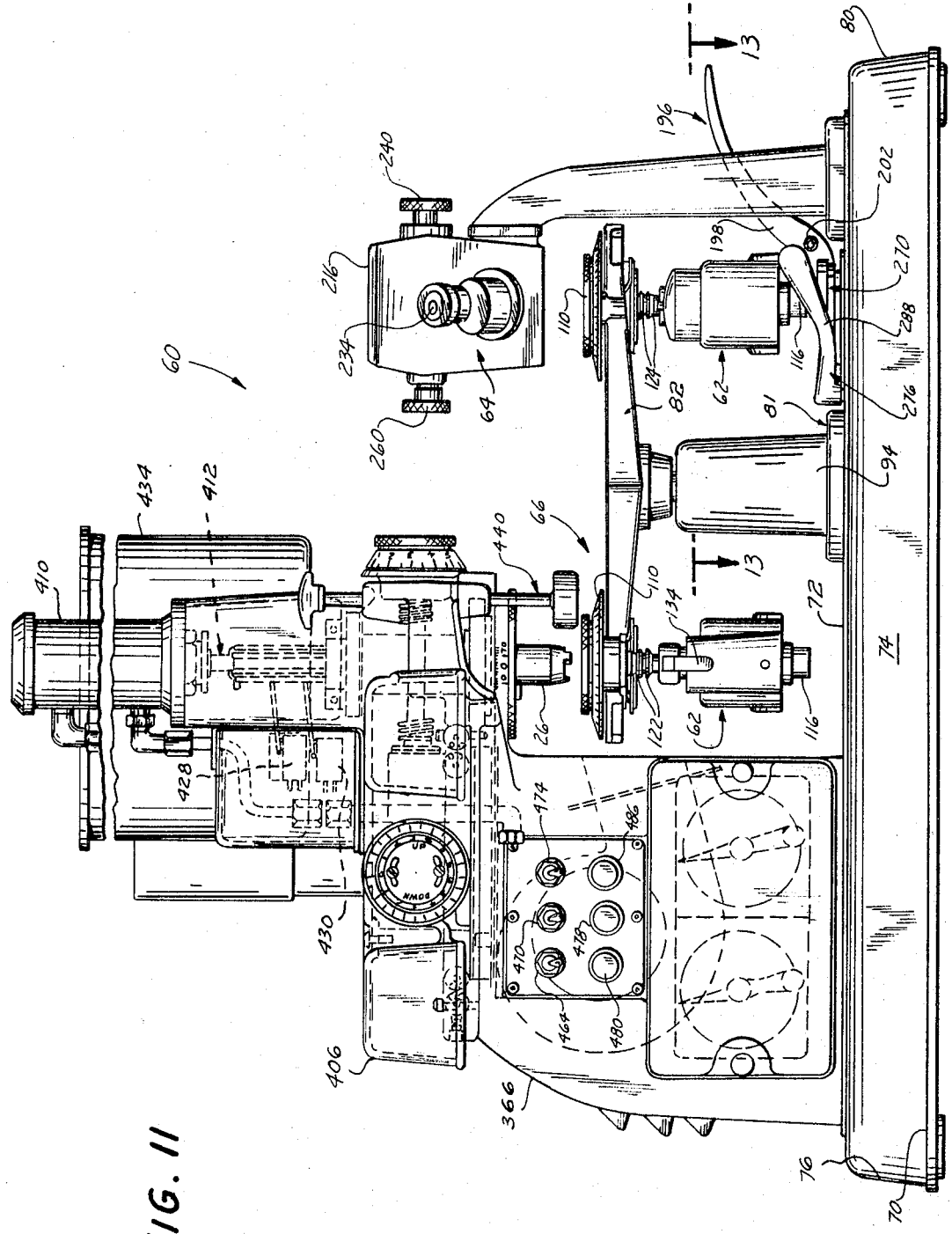

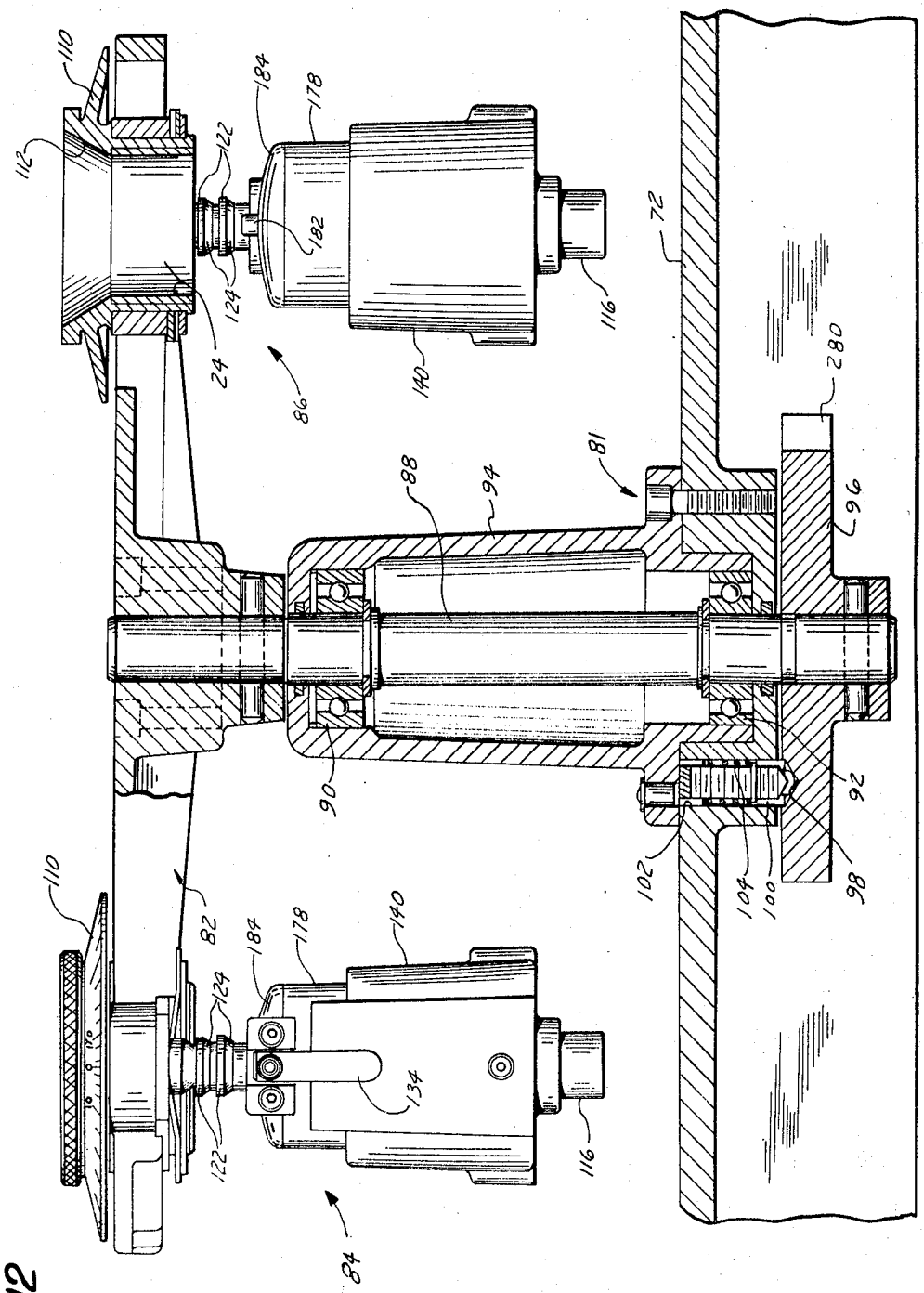

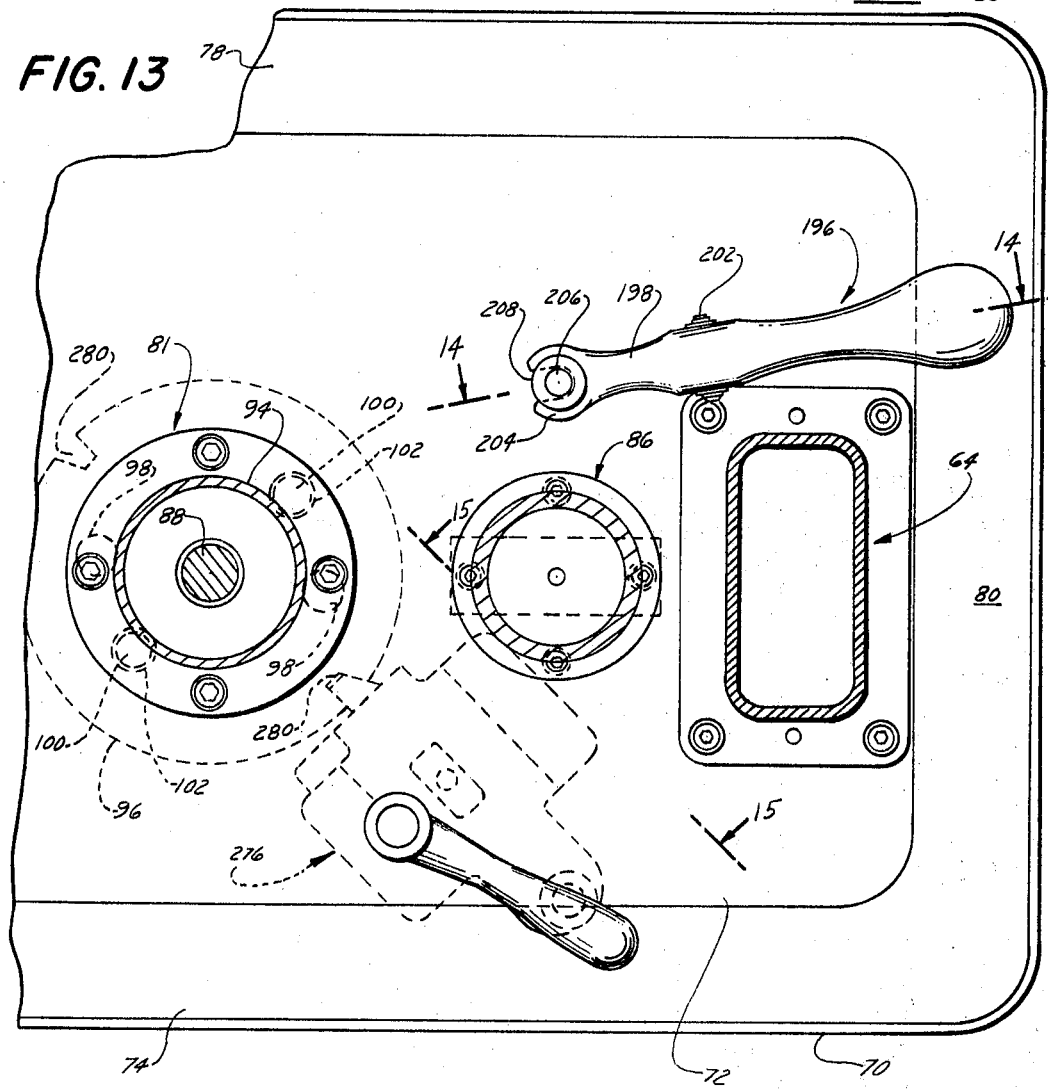
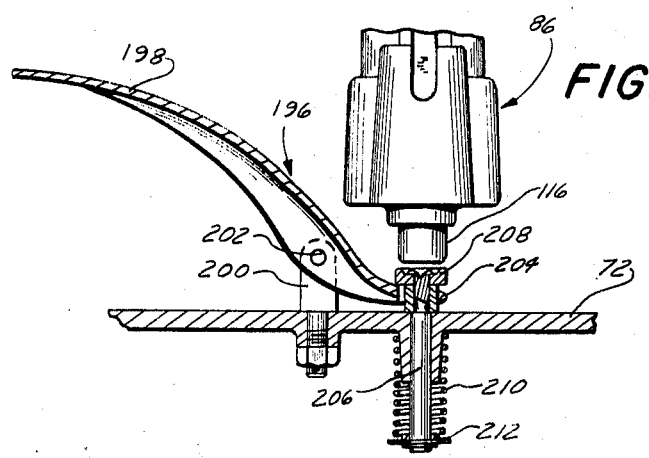

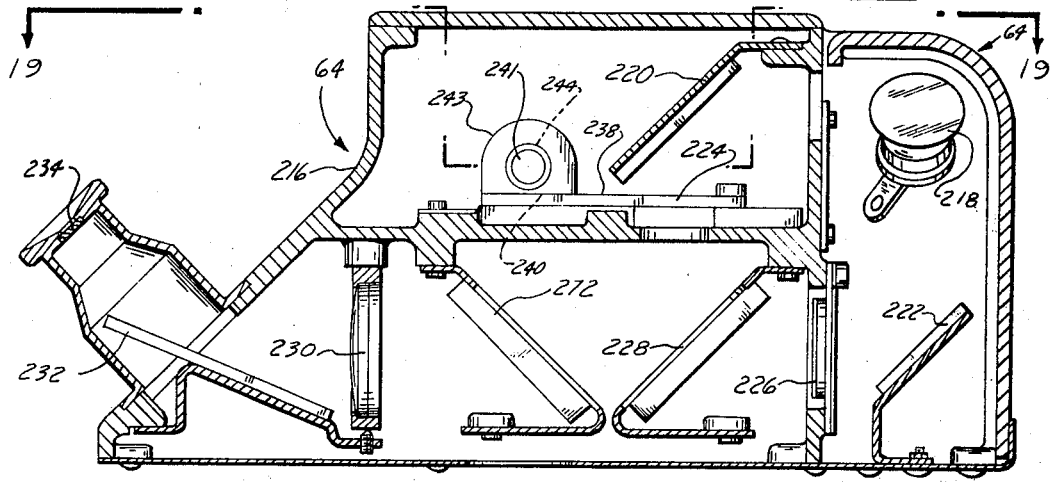
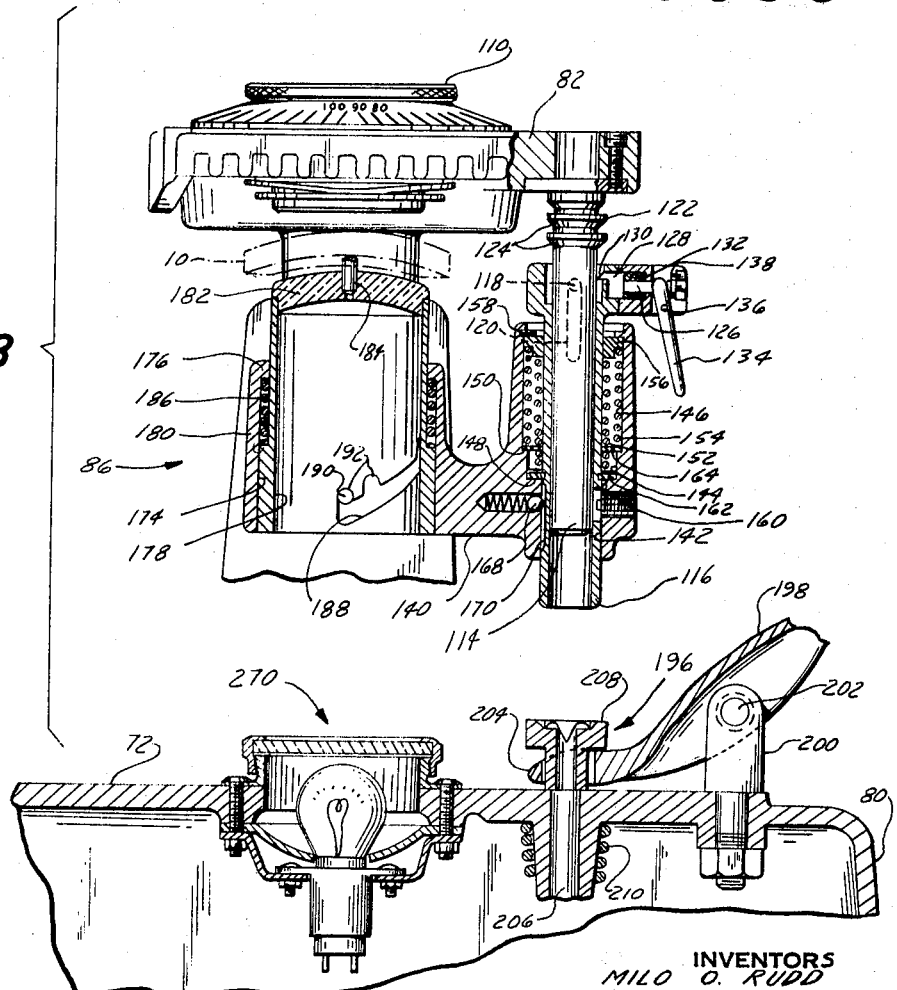
FIG. 18

INVENTORS
MILO O. RUDD
ALEXANDER M. WORONOFF
BY
Kane, Dalsimer & Kane
ATTORNEYS

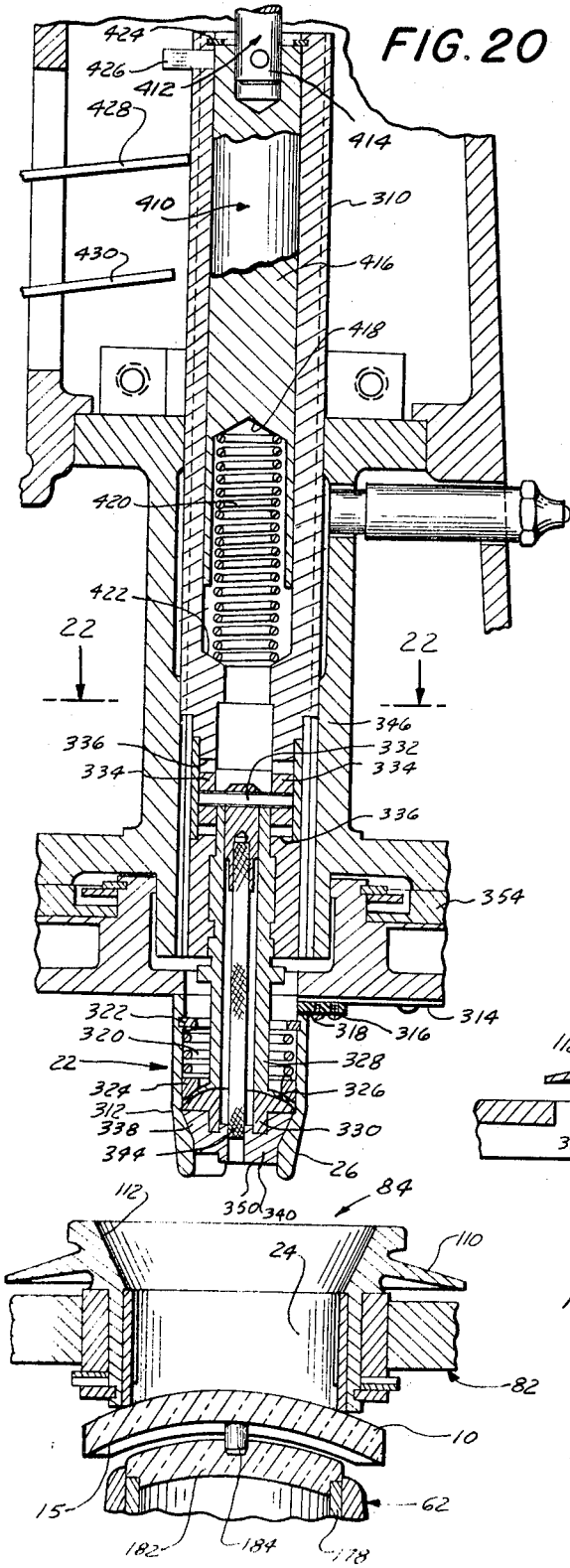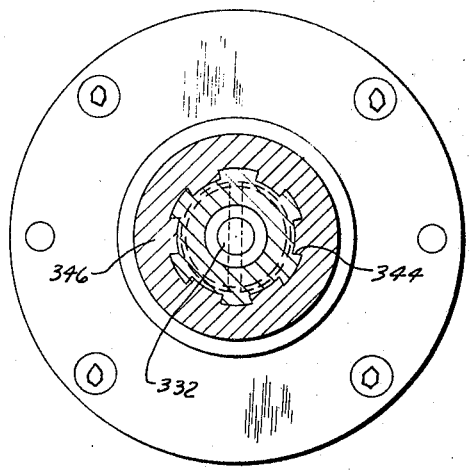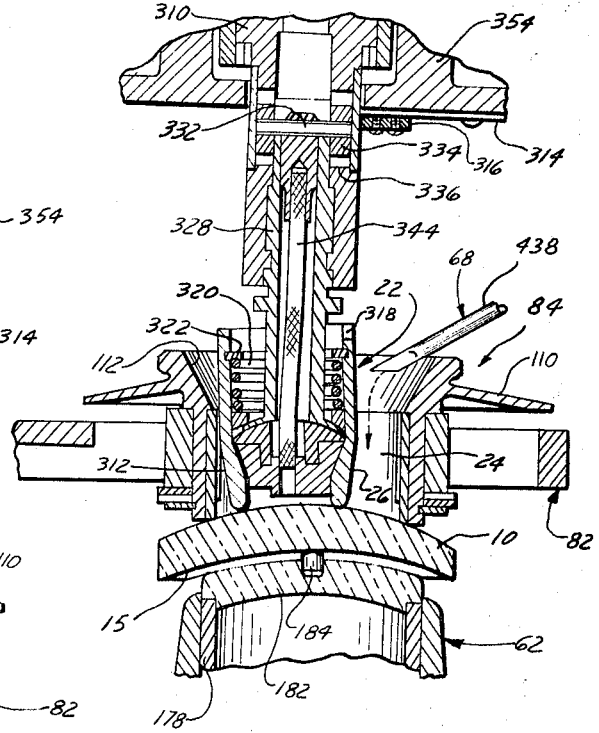

March 11, 1969   M. O. RUDD ET AL   3,431,688
METHOD FOR PROCESSING OF OPHTHALMIC LENS
Filed Feb. 4, 1965
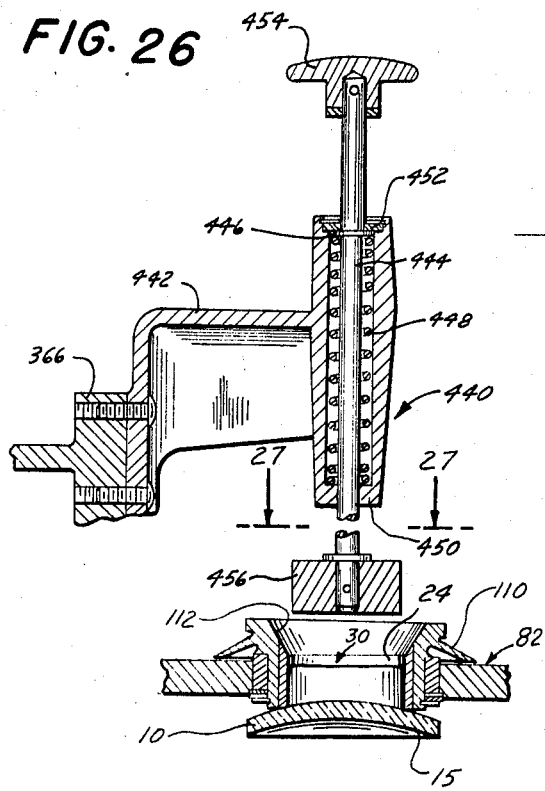
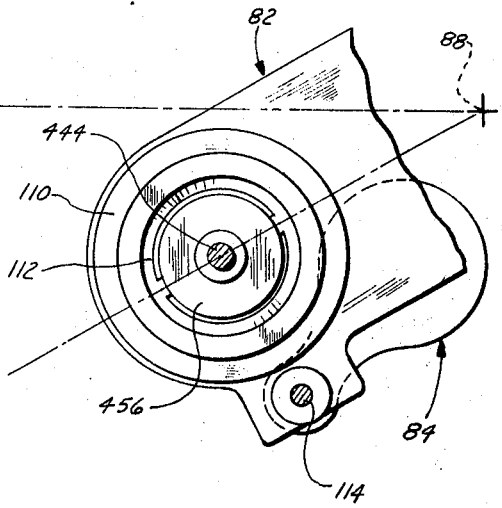
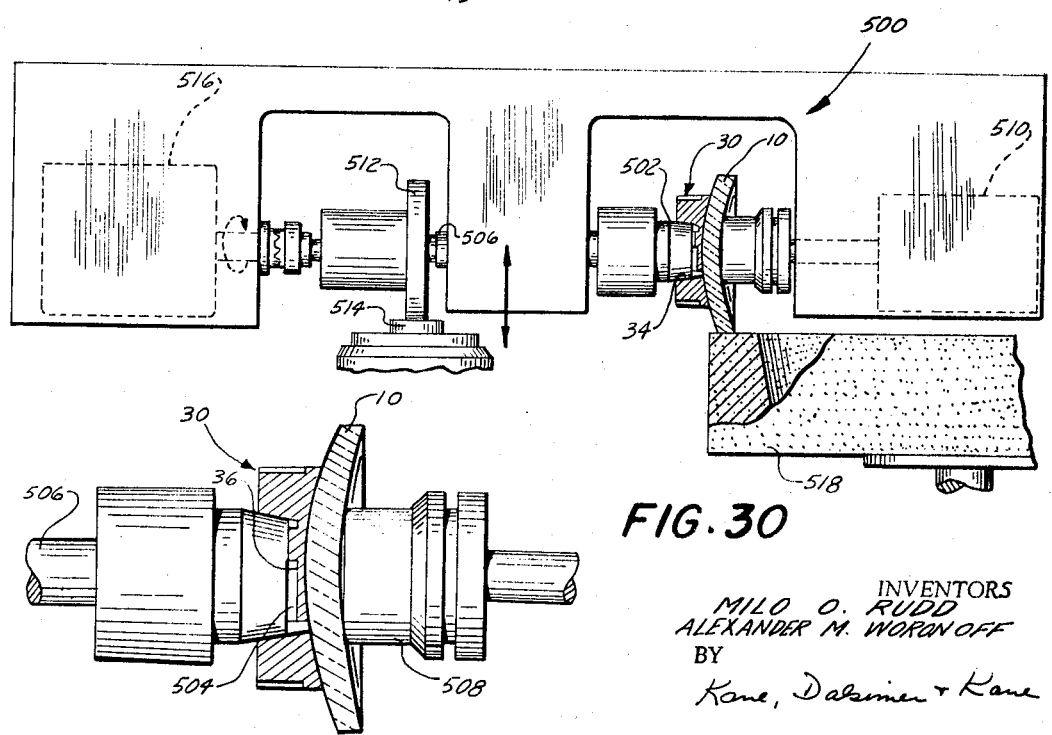
INVENTORS
MILO O. RUDD
ALEXANDER M. WORONOFF
BY
Kane, Dalsimer + Kane
ATTORNEYS

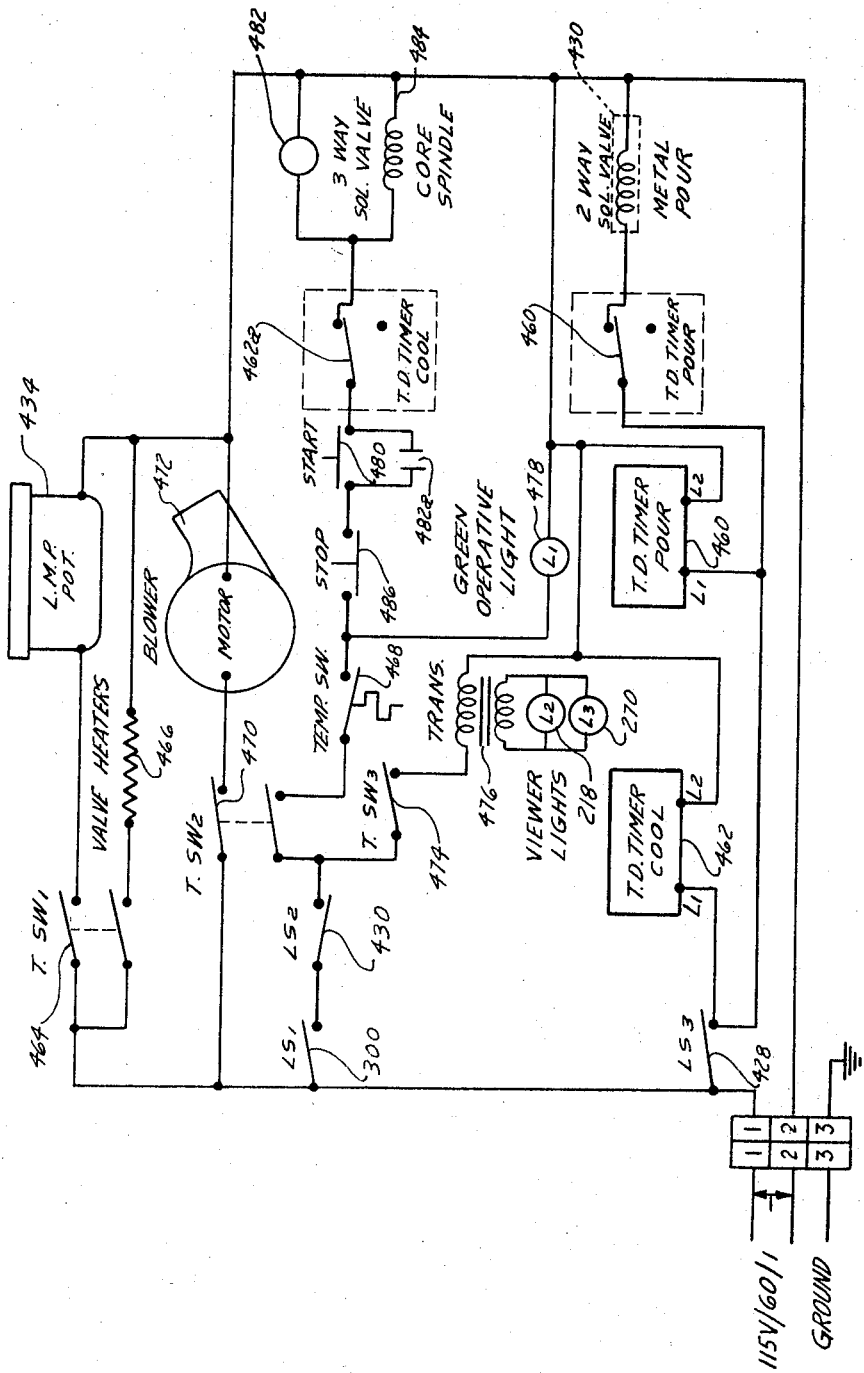

March 11, 1969   M. O. RUDD ET AL   3,431,688
METHOD FOR PROCESSING OF OPHTHALMIC LENS
Filed Feb. 4, 1965   Sheet 14 of 15
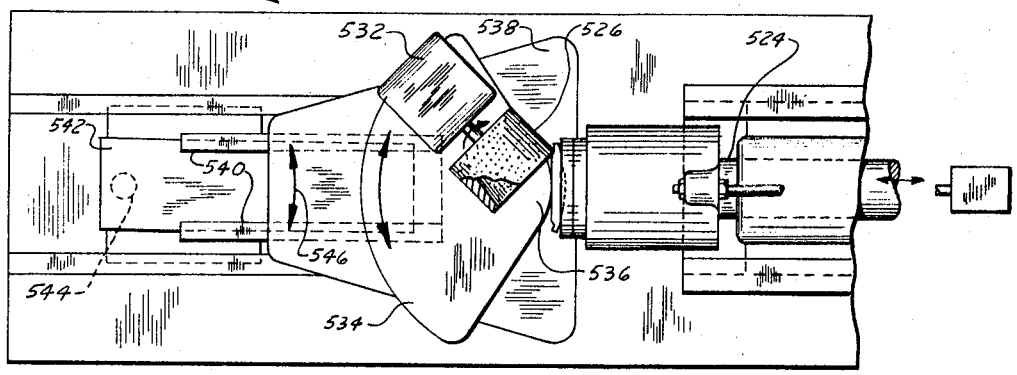
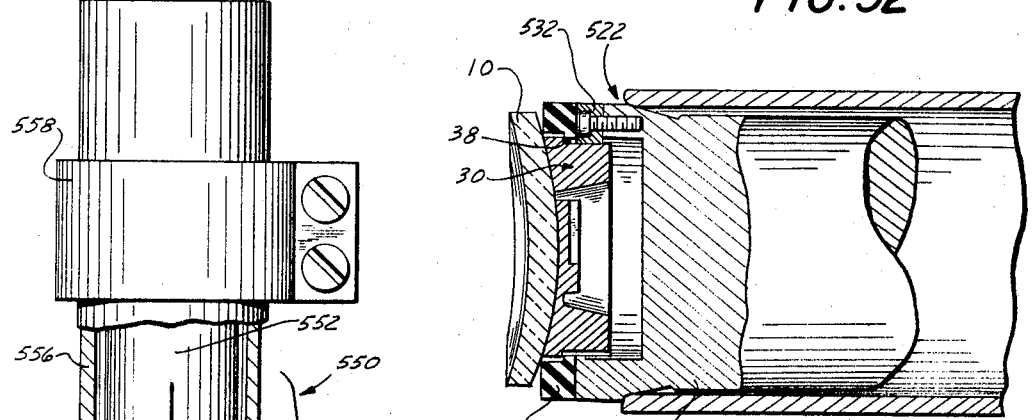
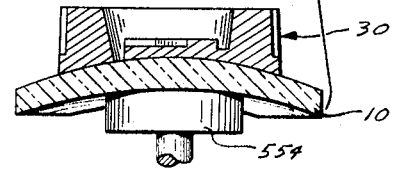
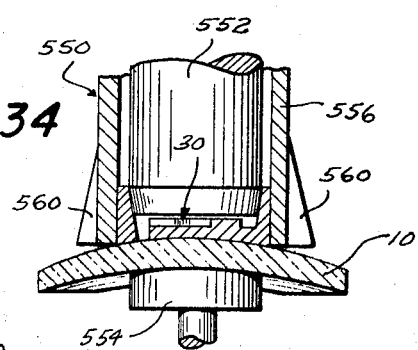
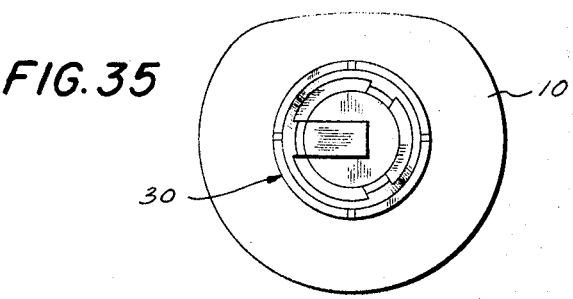
INVENTORS
MILO O. RUDD
ALEXANDER M. WORONOFF
BY
Kane, Dalsimer & Kane
ATTORNEYS March 11, 1969  M. O. RUDD ET AL  3,431,688

METHOD FOR PROCESSING OF OPHTHALMIC LENS

Filed Feb. 4, 1965

INVENTORS
MILO O. RUDD
ALEXANDER M. WORONOFF
BY

Kane, Dalsimer & Kane

ATTORNEYS

United States Patent Office 3,431,688
Patented Mar. 11, 1969

3,431,688
METHOD FOR PROCESSING
OF OPHTHALMIC LENS
Milo O. Rudd and Alexander M. Woronoff, Fort Lauderdale, Fla., assignors to Univis, Inc., Fort Lauderdale, Fla., a corporation of Ohio
Filed Feb. 4, 1965, Ser. No. 430,315
U.S. Cl. 51—284       13 Claims
Int. Cl. B24b 19/00; B22d 19/00

ABSTRACT OF THE DISCLOSURE

A method and apparatus is provided for producing an ophthalmic lens according to prescribed dimensional relations. A semi-finish lens blank is initially supported and the desired location of the ultimate mechanical center of the finished lens and of the ultimate optical center of the finished lens is determined. Molding dies are positioned on the blank such that the axes of the dies contain the ultimate mechanical center and ultimate optical center previously determined and located. The dies are adjusted about their axes relative to the supported blank in accordance with the prescribed cylinder axis. Molding material is introduced between the dies for adherence to the finished surface of the semi-finished blank for forming a plug in one molding operation having a mechanical center reference surface and an optical center reference surface. At the same time, an index is formed on the plug relative to the ultimate horizontal alignment of the finished lens. Following setting of the molding material, the dies are removed. The prescribed optical surface is then formed on the unfinished side of the lens blank with reference to the optical center reference surface on the plug. The final edge contour of the finished lens is formed with reference to the mechanical center surface and horizontal alignment index on the plug.

---

The present invention relates to a process for manufacturing ophthalmic lenses to order, i.e., to prescription according to the needs of the eventual wearer or user of the lenses.

The present methods for finishing ophthalmic lenses require the services of skilled technicians who laboriously determine the manner in which a semi-finished lens blank is gripped and ground, lapped, edged, etc. to produce the required lens surfaces properly oriented when mounted in spectacle frames on the wearer. Considerable time, and expensive labor, is involved in the present method, and there is a relatively high incidence of breakage, which of course means that work done on that lens is lost and must be completely renewed. In general, the optical laboratory purchases semi-finished blanks which are over-size as to area and thickness. One surface, usually the front surface (as mounted, or with respect to the wearer) is finished, and the other side is ground by the laboratory to prescription and the edges of this blank are finished, at which time the finished lens is mounted in the spectacle frame.

There are several factors which must be taken into account by the technician in the optical laboratory in performing the present method which results in the so-called "edged lens," i.e., the finished lens prepared for fitting in the frame. The aforementioned other surface of the blank as a rule generated as a toric surface, but occasionally as a spherical surface. A toric surface has different curvatures at right angles to each other, and is thus non-spherical. This toric surface is usually cupped in as viewed from the rear, in which case it is known as a "minus-toric." The cylinder axis of the lens is the direction of least power of the toric surface, and therefore is a definition of the orientation of the toric surface with respect to the finished edged lens. Cylinder axis is measured from horizontal in a counterclockwise direction as viewed from the front of the lens, i.e., as viewed by an observer, as distinguished from the wearer.

The finished lens has a so-called "mechanical center" which is the point within the lens to which the edge of the finished lens is referred. This is ordinarily determined by drawing a circumscribing rectangle about the lens and locating the intersection of the bisectors of the horizontal and vertical sides of such rectangle.

The "optical center" of the lens is that point at which it has zero prism. It can generally be described as the point at which a beam of light which strikes the lens will not be bent in passing through. The technician uses a layout chart which serves to locate the point where the optical center should be. In the case of bi-focal lenses which will be used hereinafter as an example, this layout chart locates the ultimate optical center of the finished lens on the blank with reference to the bi-focal segment.

The prescription furnished to the technician specifies the type of frame and from this he can determine the lens height and width, and the distance between lenses, which is the distance horizontally between the adjacent side edges of the lenses, across the bridge. The prescription also will give the pupillary distance for the wearer. The prescription will also tell, in the case of multifocal lenses, where the top of the reading segment of the lens is located with respect to the bottom of the finished lens.

Working from the prescription, the technician, at present, positions the semi-finished blank on a layout chart, determines the desired ultimate location of the optical center, and then marks on the blank the position of this center and cylinder axis line as determined by prescription. He adheres a block to the finished side of the semi-finished lens with a suitable adhesive material, and this block has three holes which are aligned with the cylinder axis, the center hole lying on the optical center. The block is gripped in a collet and the blank swept by a rotating grinding wheel. The diameter of the wheel together with the angle of the wheel with respect to the other side of the blank determines one radius of the toric surface; the other radius of the toric surface is determined by the curve through which the wheel is swept over such other side of the blank. The blank is then ground and polished with standard lapping equipment, using tools precut to correspond with the toric surface generated by the grinder, after which the lens is removed from the block and returned to the technician. It should be noted that all of the grinding and finishing operations have been performed on the entire semi-finished blank.

At this time the technician determines and marks the mechanical center of the blank and also marks a horizontal axis line through the mechanical center of the lens, and the blank is cut and chipped to its ultimate edge form, but left approximately one millimeter over-size. The blank is then mounted into an alignment fixture, by visual alignment based on the marked mechanical center and horizontal axis, and placed in an edging machine which is cam controlled to produce the finished lens of the required size and contour.

It will be apparent from the foregoing, which is but a general description of present methods, that the optical laboratory technician must spend considerable time and effort in measuring, marking and aligning the semi-finished blank, and that the rear surface is completely finished to prescritpion before the semi-finished blank is cut to its ultimate contour. Considerable time and expensive labor of a skilled technician is required, the grinding and finishing lapping operations are performed over substantially the entire area of the semi-finished blank, the technician spends further time preparing and mounting the blank in the alignment fixture, and then it is possible in the edge cutting operation that the blank may be broken.

Accordingly, the primary purpose of this invention is to provide a novel method according to which a technician can rapidly determine the ultimate mechanical center and the ultimate optical center of the finished edged lens, and secure a plug on the lens properly referenced to each of these centers while taking into account the required cylinder axis; then the semi-finished blank, for the purposes of reducing grinding and polishing time can be reduced in size to a smaller semi-finished blank having its area balanced about the ultimate mechanical center of the lens; after which the prescribed surface, in its more frequent form a toric surface, is formed on the blank followed by finished grinding, polishing and edging to produce the finished lens ready for fitting in the frame.

Another object of the invention is to provide a novel method of processing multifocal ophthalmic lenses in which the ultimate mechanical center of the finished lens is determined on the semi-finished lens blank by viewing the multifocal segments of the blank simultaneously with a target which appears coincident in position with the segments, a moid fixture is oriented on the semi-finished blank in predetermined alignment with the ultimate optical center of the finished lens and a further mold fixture is oriented on the semi-finished blank in a predetermined alignment with the ultimate mechanical center and offset from the optical center of the blank as referenced from the target, including azimuth correction according to the cylinder prescription. A plug is then moulded or cast between these fixtures which, upon hardening, is separated from such fixtures, and this plug is employed in aligning and holding the blank during generating, lapping and preliminary edging operations.

A further object of this invention is to provide a novel method of processing ophthalmic lenses according to prescription, wherein the prescription is translated into predetermined locations of holding and aligning surfaces, such surfaces are thereby properly located on a semi-finished lens blank and then a plug bearing such surfaces are utilized by workmen unskilled in the ophthalmic art properly to hold and locate the blank while the prescribed optical surface is generated, ground and polished and while a finished lens is formed from the blank with its edge or contour properly referenced to the prescribed location of the optical and mechanical center and the contour of the finished lens.

Other objects and advantages of the invention will be apparent from the following description, the accompanying drawings and the appended claims.

Figure 5:
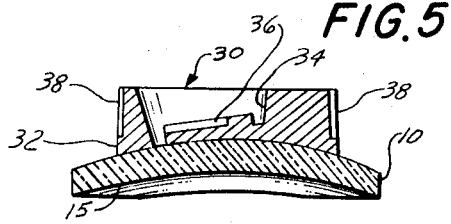
Figure 7:
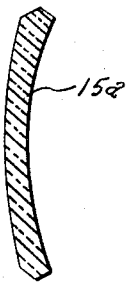
Figure 6:
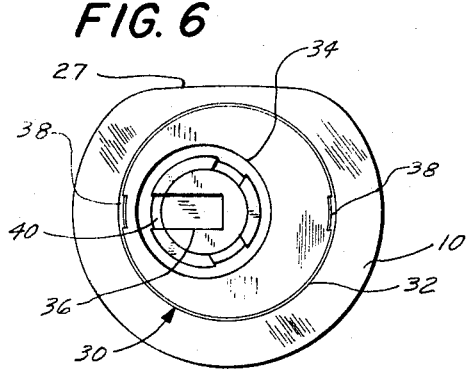
Figure 8:
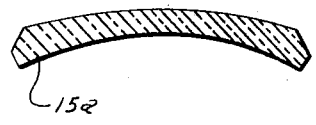
Figure 9:
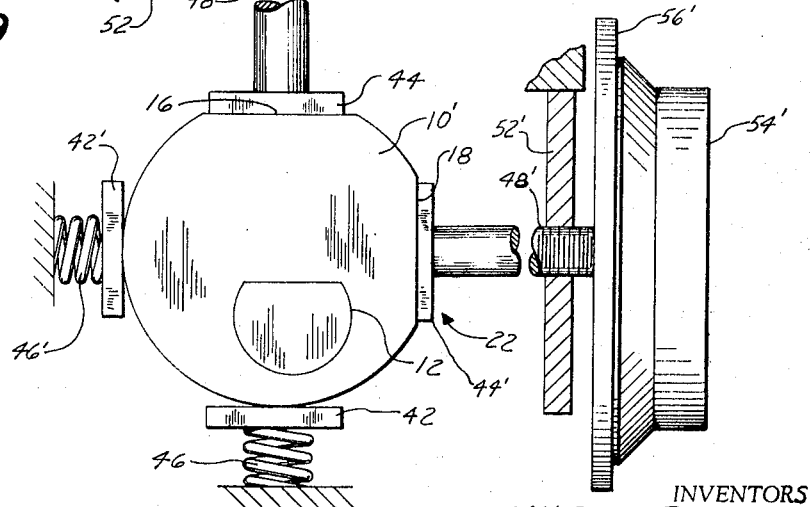
Figure 10:
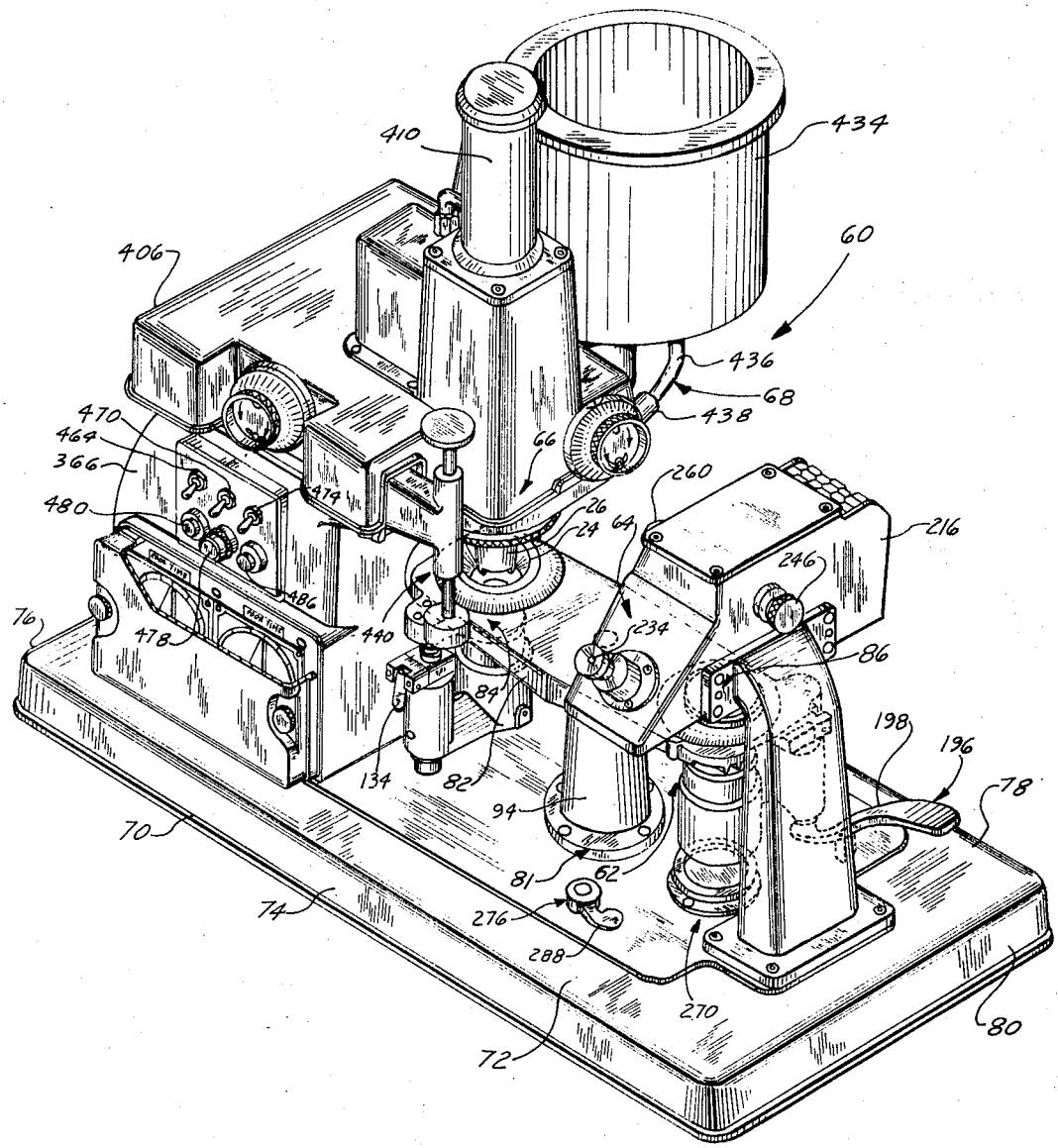
Figure 15:
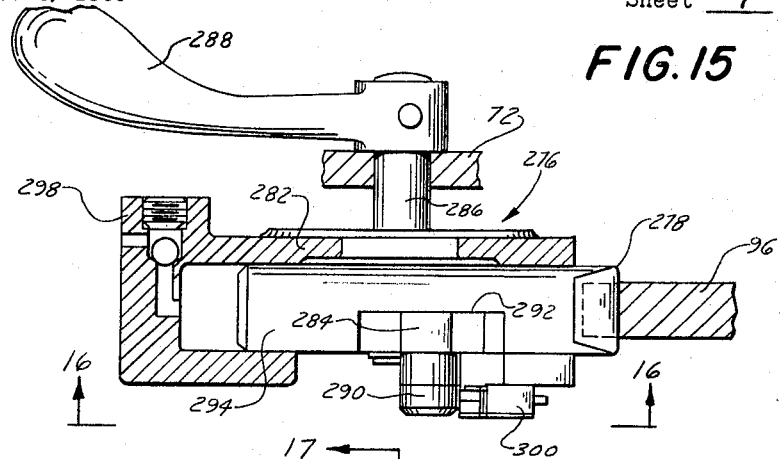
Figure 16:
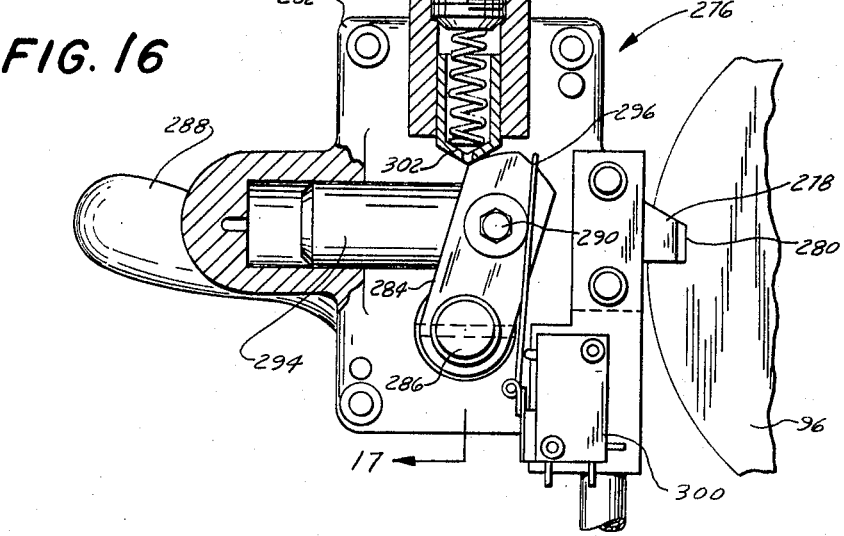
Figure 17:
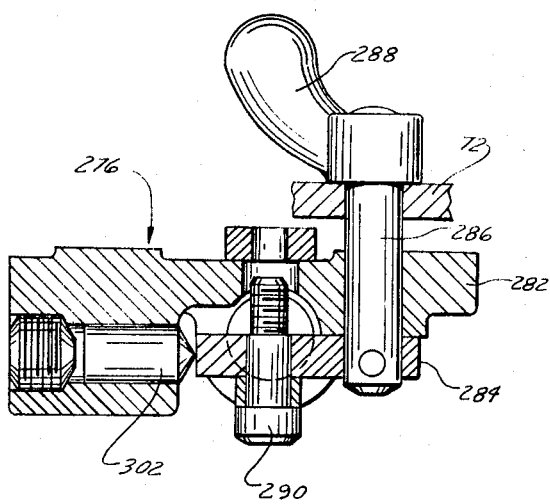
Figure 19:
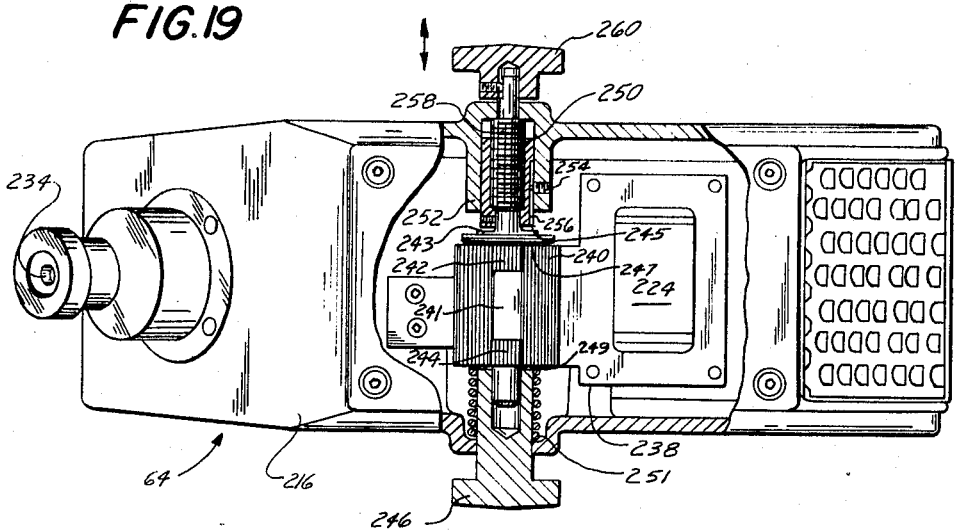
Figure 23:
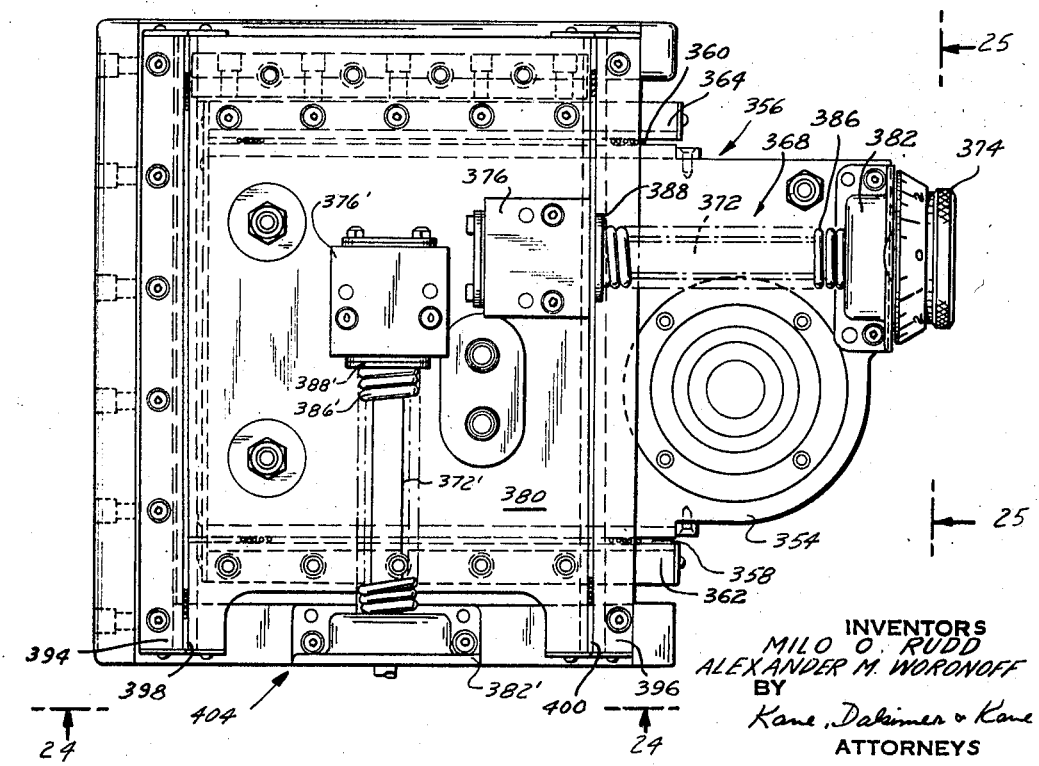
Figure 24:
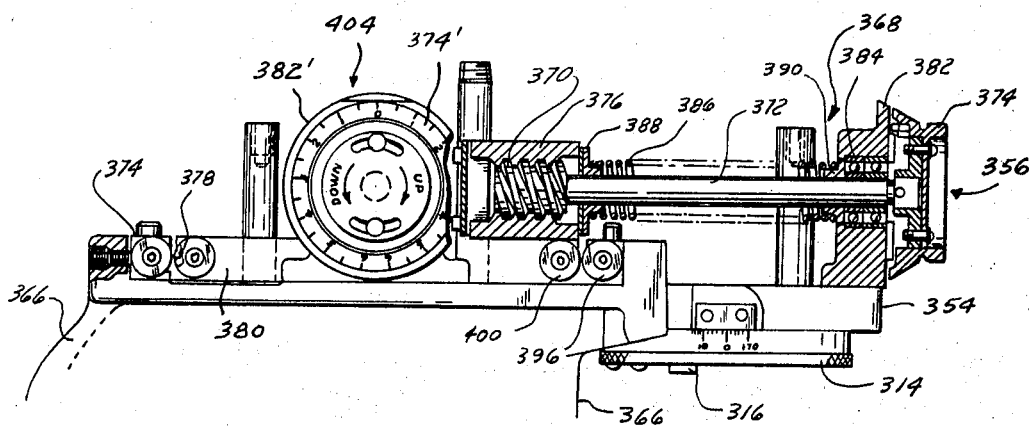
Figure 25:
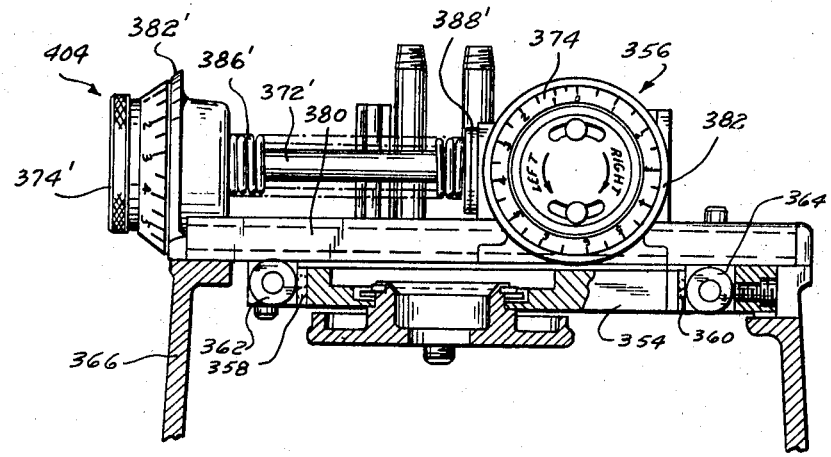
Figure 36:
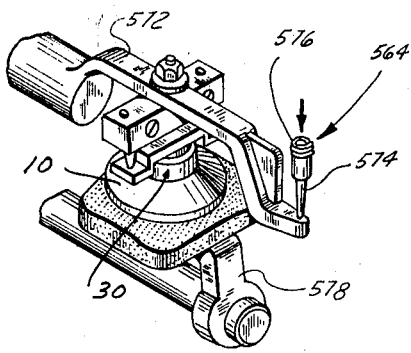
Figure 37:
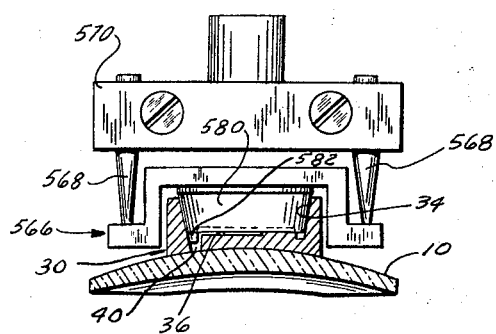
Figure 38:
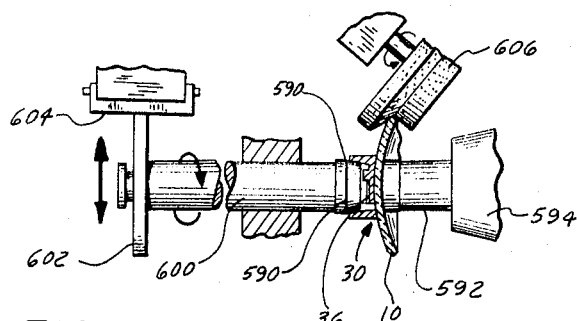
Figure 41:
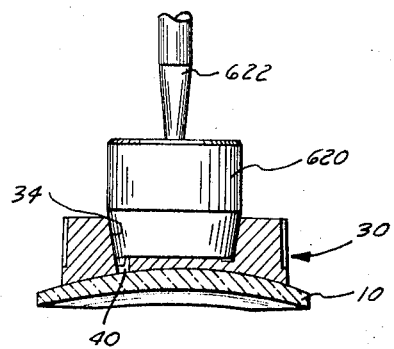
Figure 39:
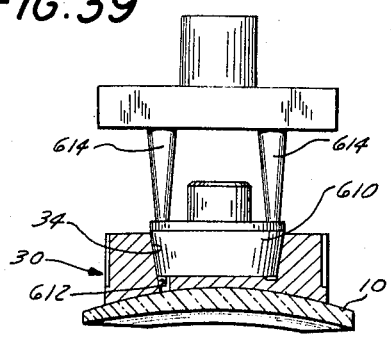
Figure 42:
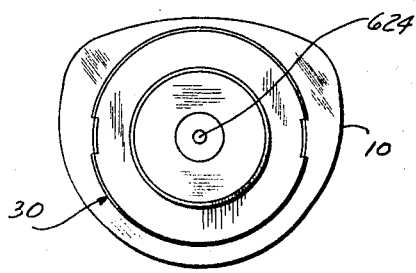
Figure 40:
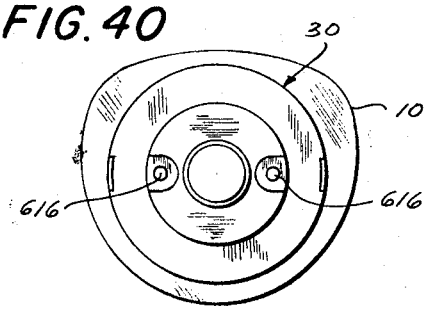

FIG. 5 is a cross-sectional view through the semi-finished lens blank and molded reference plug adhering to the convex side of the blank, showing the tapered inner core, the conical side face of which is a reference for the mechanical center, the exterior plug side face referencing the optical center, the latter surface having key slots for receiving mating parts of a toric generator and a somewhat centrally located key slot for referencing the horizonal axis and positioning the blank for preliminary edge shaping and final edging operations;

FIG. 6 is a top plan view of this assembly of blank and reference plug;

FIG. 7 and 8 are sectional views taken at right angles to each other through the center of the finished lens and illustrating the general arrangement of the toric surface formed on the rear of the lens as well as a suitable finished edge;

FIG. 9 is a fragmentary and schematic view showing the general operation of the lens blank positioning station of a contemplated embodiment of blocker for a semi-finished blank of the multifocal type having reference flats for orienting and positioning the blank in a predetermined manner;

FIG. 10 is a perspective view of another embodiment of blocker for locating and molding the reference plug on the convex finished side of a semi-finished blank;

FIG. 11 is a front elevational view of this blocker;

FIG. 12 is an enlarged fragmentary view partly in section of the turntable assembly for the lens mounting assemblies;

FIG. 13 is a fragmentary plan view of the blocker with certain parts broken away and removed taken along the line 13—13 of FIG. 11;

FIG. 14 is a fragmentary sectional view taken through the lens mounting station and showing the pressure inducing lever means for clamping a lens blank taken along the lines 13—13 of FIG. 11;

FIG. 15 is an enlarged fragmentary sectional view of the lach mechanism employed for releasably locking the turntable of the blocker in either the lens mounting position or plug molding position as viewed along the line 15—15 of FIG. 13;

FIG. 16 is a bottom plan view of this latch plan mechanism view along the line 16—16 of FIG. 15;

FIG. 17 is a sectional view taken along the line 17—17 of FIG. 16;

FIG. 18 is a fragmentary enlarged sectional view through the lens mounting station showing the relative disposition with respect to the viewing station, lamp assembly therefor and clamping lever for actuating the lens mounting assembly;

FIG. 19 is a top plan view partly broken away of the of the target and lens blank viewer along line 19—19 of FIG. 18;

FIG. 20 is an enlarged fragmentary sectional view through part of the plug molding station showing the details of the dies employed in molding the referencing plug;

FIG. 21 is a similar view of the dies associated with one another and with a lens blank ready for molding the referencing plug;

FIG. 22 is a sectional view taken along the line 22—22 of FIG. 20;

FIG. 23 is a top plan view of the mechanism for shifting the inner die member relative to the outer die member;

FIG. 24 is a fragmentary elevational view taken along line 24—24 of FIG. 23;

FIG. 25 is a fragmentary view taken along the line 25—25 of FIG. 23;

FIG. 26 is an enlarged fragmentary sectionel view of a striker mechanism for assuring the separation of the lens blank and plug assembly from the molds;

FIG. 27 is a fragmentary plan view of the turntable indexing wheel showing the latching means for the turntable for determining the positioning thereof at the lens blank plug assembly ejector station;

FIG. 28 is a schematic wiring diagram of the blocker;

FIG. 29 is a somewhat diagrammatic illustration of contouring apparatus used to form the edge contour on the blank as shown in FIG. 6;

FIG. 30 is an enlarged fragmentary view showing the holding means of the blank and plug assembly in apparatus of this type;

FIG. 31 is a schematic plan view of a typical toric surface generator used in the method of this invention;

FIG. 32 is an enlarged fragmentary sectional view showing the chucking means for this toric generator;

FIG. 33 is a schematic elevational view partly in section showing mechanism for removing radially exterior portions of the reference plug prior to the final edging of the blank;

FIG. 34 shows the association of this mechanism with the plug during the removal operation;

FIG. 35 is a top plan view of the blank and plug assembly showing portions of the plug removed;

FIG. 36 is a perspective view showing the general manner in which the assembly of the blank and plug is engaged with conventional apparatus for grinding and polishing the generated surface of the blank;

FIG. 37 is an enlarged elevational view of the chucking means of the blank and plug assembly of apparatus of this type;

FIG. 38 is a somewhat schematic view of the finished edge grinding apparatus;

FIG. 39 is another form of chucking means that may be employed, for example, in the toric surfacer;

FIG. 40 is a top plan view thereof with certain parts removed;

FIG. 41 is another form of chucking means that may be utilized as, for example, in the sphere surfacer; and FIG. 42 is a top plan view thereof.

Figure 1:
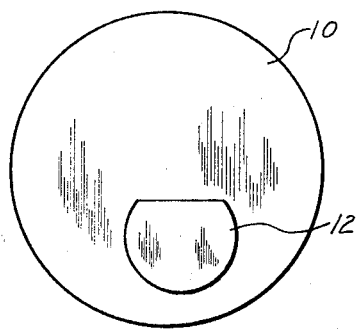
FIG. 1 is a view of a semi-finished blank of the improved multifocal type for processing in accordance with the invention to form an ophthalmic lens according to prescription.
Figure 2:
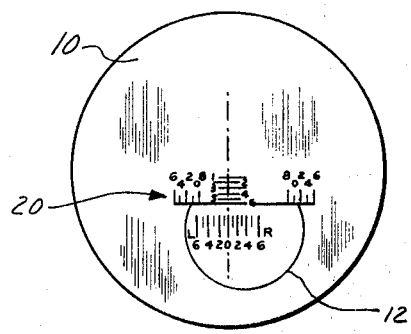
FIG. 2 is a view of the semi-finished blank, showing the manner in which an alignment target is viewed and the bi-focal segment of the blank is located with respect to this target.
Figure 3:
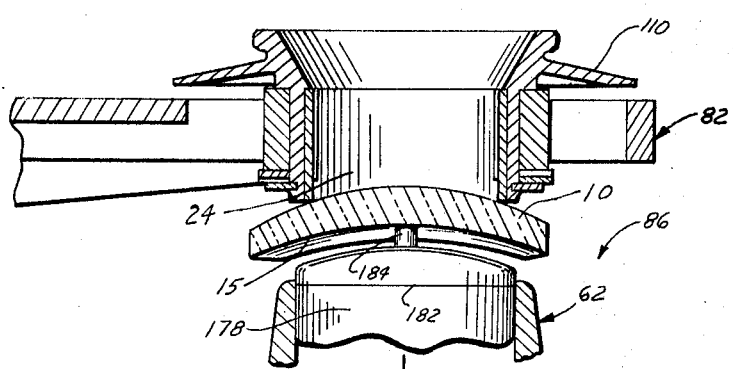
FIG. 3 is a sectional view of the semi-finished blank showing the concave side of the blank supported by a round pin supported in a transparent lens window with an outer mold being associated with the convex side of the blank, this mold providing the die face for referencing the optical center on the molded plug.
Figure 4:
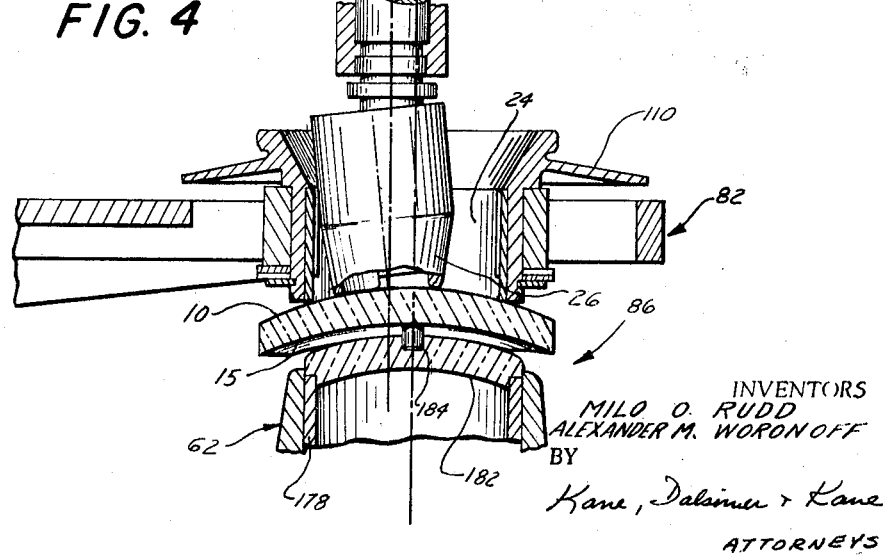
FIG. 4 is a similar view showing the inner mold associated with the convex side of the blank for referencing the mechanical center on the molded plug.

Referring to the drawings, which illustrate the steps of the method and a preferred embodiment of novel apparatus for performing certain steps in the method, a typical semi-finished lens blank 10 is shown in FIGS. 1 and 2 in the condition in which it is received from the supplier by the optical laboratory. For purposes of illustration and explanation, the blank shown as a bifocal blank having the main portion of one index of refraction and a bifocal segment 12 of a different index of refraction. In the blank illustrated, the front or outer surface, in other words, that surface which would be on the exterior of the finished spectacles, is finished to a predetermined contour, usually spherical, and the rear surface 15 (FIG. 3) is that which has the prescribed optical surface formed in accordance with the necessary optical corrections for the individual eyes of the ultimate wearer of the spectacles. It is possible that this arrangement can be reversed with the multifocal segment on a rear finished surface, and the prescription surface formed on the front, but this is unusual.

As explained, this prescription surface 15a (FIGS. 7 and 8) in most cases is a toric surface, having one radius of curvature across the lens in one direction (FIG. 7) and a different radius of curvature in a direction of right angles (FIG. 8). These two directions are at right angles to each other, and the amount by which the cylinder axis is tilted (with respect to a horizontal line across the finished lens when mounted) is expressed in terms of degrees.

Following mounting of the blank 10, the technician then positions a plug forming mold including cores or dies 24 and 26 on the front or convex surface of the blank 10. This mold is defined by an external mold 24 which serves to contour the plug with an optical axis reference and an internal mold 26 which serves to contour the plug with the mechanical center reference. These molds 24 and 26 will also have been aligned azimuthally with respect to a lens blank 10 and, more specifically, with the horizontal reference axis according to the prescribed cylinder axis.

Thus, the optical center is first located with respect to the segment 12 and then the mechanical center is located with respect to the optical center. The horizontal axis reference is maintained without change regardless of all other changes in the core position during molding or blocking.

This horizontal reference is, as explained, parallel to the top of the segment line. The means for molding the reference for the cylinder axis is also adapted to be adjusted to the required axis before the core 26 is lowered into contact with the lens blank 10.

A reference plug 30 is then cast through the employment of suitable material, as for example, a low melting point alloy which is poured in molten state between the molds 24 and 26 over the front surface of the blank 10. One suitable type of bonding alloy, which provides the requisite adherence to the lens surface, is an antimony-lead compound (or the like) having a melting point of around 158° F. This bonding material hardens rapidly, for example, within about 30 seconds. On setting and hardening of the reference plug 30, the molds 24 and 26 are disassociated from the assembly of lens blank 10 and reference plug 30.

The assembly upon completion will have the plug 30 located with respect to the lens blank 10 whereby the external surface 32 serves as the optical center reference. The axial center line of the optical center reference 32 contains the ultimate optical center of the finished lens. The reference plug 30 is formed with an inner somewhat conical surface 34 serving as the mechanical center reference. The axial center line of the mechanical center reference 34 contains the utlimate mechanical center of the finished lens. Cavity or key slot 36 is formed in the plug 30 having its aximuthal position in fixed relation to the horizontal position or axis reference of the mounted finished lens, i.e., with the top of segment 12 horizontal. A pair of diametrically opposed key slots 38 is formed in the exterior of the plug 30 and cooperate with the chucking means of a toric generator duly described shortly. The radial key slot 40 cooperates with the chucking means of the smoothing and polishing apparatus to be described shortly.

In FIG. 9, a semi-finished lens blank 10' is somewhat automatically aligned and mounted in accordance with one embodiment of this invention through the employment of referencing or positioning flats 16 and 18 adapted to cooperate with mating parts of the aligning mechanism 22 of a blocker. This blocker may otherwise assume the form of the blocker 60 to be described in detail herein. Thus, the mechanism 22 will include two pairs of adjustable and resilient clamping members. One of the clamping members cooperates with flat 16 and includes the gripping jaws 42 and 44, the former being spring biased by means of the spring 46 to provide the desired degree of resiliency. The other jaw 44 is coupled with a longitudinally displaceable shaft 48 supported by a fixed support 52. The free outer end of the shaft 48 is conveniently coupled with a dial 54 through a suitable splined connection (not shown) or other suitable coupling whereby the dial remains associated with a fixed face. This face, 56, together with the dial 54, may conveniently include suitable indicia with index marks whereby the relative rotational displacement of these parts can be readily noted. The other cooperating clamping member is composed of essentially identical parts and for this reason will not be described but will be identified in the drawings through the use of the same numerals with accompanying primes. It should be evident that controlling the position of the flats 44 and 44' through the dials will serve to locate the lens blank precisely in an intended position for casting the molded plug previously described.

The lens blank 10 will have been supplied with the reference flats 16 and 18 accurately positioned with respect to the vertical and horizontal location of the segment 12. Such references replace the visual alignment of the segment with the target in the blocker. These edge references may also serve to locate the segment in the X and Y axis directions, thus avoiding the need to align the segment visually with a viewing device. Each of the two flat edge reference surfaces shown in FIG. 9 could be a controlled constant distance from the reading segment outline. These edge references then take the place of the actual segment as far as controlling the position and orientation of the blank with respect to the optical center mold 110. Such references would avoid the need to align the segment visually with the target in the blocker.

Reference is now made to the blocker 60 which is adapted to receive the semi-finished lens blank 10 and align it for placement of a molded reference plug 30 thereon. The blocker 60 includes a lens blank mounting station 62 at which the lens blank 10 is aligned and its convex surface correctly positioned against mold 24 for properly performing subsequent operations while in the blocker. Towards this end, a target viewing station 64 is associated therewith for providing a referencing target and index 20. The blocker 60 is designed and constructed on a turn-table principle whereby the mounted lens blank 10 and mold 24 may be turned to a plug molding station 66. Here the mold 26 is properly oriented and positioned on the convex side of the lens blank 10. The reference plug 30 is thereafter poured and set in an automatic fashion once the pouring has been initiated. A low melting point alloy dispensing station 68 supplies the material from which the plug 30 is formed.

The blocker 60 deploys its stations on a selected support through the base 70 in the form of an inverted tray having a top panel 72 and downwardly depending side aprons 74, 76, 78 and 80. A turntable assembly 81 is mounted centrally of the top panel 72. This assembly includes a table 82 of substantially oblong configuration having at each of its ends a pair of identical lens mounting assemblies 84 and 86. The table 82 at its relative center is suitably keyed to a rotatable shaft 88. This shaft is supported in an upright position, and its pivotal movement is afforded by a pair of ball bearings 90 and 92. These bearings are interposed between the shaft 88 and an upright standard 94 anchored to the top panel 72. The lower end of the shaft 88 has keyed thereto an index wheel 96. The upper face of the index wheel is provided with a pair of diametrically opposed indexing holes 98 adapted to receive a spring biased indexing plug 100 longitudinally shiftable in aperture 102 under the bias of spring 104 in the top panel 72. The engagement of the lower end of the plug 100 with either of the mating holes 98 determines the placement of either of the lens mounting assemblies 84 or 86 at the lens blank ejector station the operation of which will be described.

Referring now to the lens mounting assembly 84 and 86 which will bear corresponding numerals for identical parts, it will be noted that each is provided with a dial 110 bearing a scale of angles from zero to 180° on one half of the dial face and then again zero to 180° on the second half for purposes of introducing the prescribed cylinder axis. This dial is rotatably mounted on the turntable 82 and suitably retained associated therewith, as shown. The dial is provided with a central opening 112 to permit viewing therethrough in order to properly position a lens blank 10 in the lens mounting assemblies 84 or 86. Each of the lens mounting assemblies 84 or 86 includes a downwardly depending shaft 114 suitably anchored to the turntable 82. This shaft serves to mount a collar 116 which is afforded limited longitudinal movement with respect to the shaft by means of the pin 118 extending from the shaft into a longitudinally extending slot 120 provided in the walls of the collar. In a manner to be described in detail shortly, lens blanks 10 of different thicknesses are adapted to be received by either of the lens mounting assemblies 84 and 86 through the operation of latch assemblies including the series of circumferentially extending radial flanges 122 each having a forward camming face 124 to facilitate the latching function. A spring biased latch 126 engages with these flanges; and, in this connection, is provided with a latch face 128 and, at the same time, a bevelled face 130 for riding against the bevel faces 124. The latch 126 is biased towards the shaft 116 by means of the spring 132. A handle 134 pivotal about pin 136 is adapted to shift the latch radially outwardly against the bias of the spring 132 by camming against the radial flange 138 of the latch 126.

A standard 140 extends laterally from the collar 116 and is adapted to be resiliently supported thereby. In this connection, the standard is provided with a bore 142 enlarged into bore sections 144 and 146 which define stepped shoulders 148 and 150. A pair of concentric springs 152 and 154 are disposed exteriorly of the collar 116 and within the bore sections. The spring 152 is biased at one end against a stepped washer 156 which, in turn, is limited in its upward movement with respect to the standard 140 by means of a retaining ring 158. The lower end of this spring is biased against a washer 160 which, in turn, is limited in its downward movement with respect to the collar 116 by means of the lock washer 162. The outer concentric spring 154 is biased at one end against the washer 156 and, at the other end, against a washer 164, in turn, limited in its downward movement with respect to the standard 140. Thus, the arrangement of parts depicted by FIG. 18 will permit upward movement of the collar 116 relative to the standard 140 for purposes of permitting the latch 126 to engage with the flanges 122.

A spring biased pin 168 extends into the bore 142 of the standard into an accommodating recess 170 in the exterior of the collar 116 for purposes of cooperating in preventing undesirable rotational movement of the collar 116 relative to the standard 140.

The standard 140 is also provided with an enlarged bore opening 174 terminating at its upper end in a radially extending flange 176. This bore opening 174 conveniently receives a tubular member 178 formed exteriorly with a shoulder 180. The top of the tubular member 178 serves to receive a glass transparent window 182 in a suitable permanent fashion. This window has projecting upwardly and outwardly therefrom a pin 184. This pin 184 serves to receive the concave face 15 of the lens blank 10. The tubular member 178 is spring biased in a downwardly direction by means of a spring 186 biased between shoulder 180 and flange 176. The tubular member 178 is adapted to be shifted upwardly against the bias of the spring 186 for purposes of accommodating lens blanks of different thicknesses. With this in mind, the tubular member is provided with a cut-out portion 188 extending obliquely with respect to the horizontal for purposes of receiving an inwardly extending pin 190 projecting from the standard 140. This pin 190 is adapted to be received by one of a series of accommodating slotted portions 192 of the recess portion 188.

The lens blank 10 is, accordingly, adapted to be mounted in place in the selected lens mounting assembly 84 or 86 by initially placing the lens blank 10 on the pin 184 or, alternatively, against the lower circumferentially extending edge of the dial 110. The collar 116 is then shifted upwardly on the shaft 114 until the latch 126 engages the appropriate flange 122. If desired or necessary, the amount of pressure exerted by the pin 124 and cooperating lower edge of the dial 110 against the blank 10 may be regulated by selecting the appropriate flange 122 for latching with the latch 126 or, for that matter, the appropriate slotted portion 192 for receiving the inwardly extending pin 190.

A lever assembly 196 is adapted to be actuated for purposes of causing this relative vertical shifting of the collar 116 and consequent securement of a lens blank 10 within the particular lens mounting assembly 84 or 86. The assembly 196 includes a lever 198 pivotal on an upstanding bracket 200 by means of a pivot pin 202. The lower end 204 of the lever 198 straddles a pin 206 which supports a platform 208 adapted to engage the base of the collar 116. This pin is biased in a downwardly direction by means of a spring 210 biased against the platform 72 and a radially extending retaining ring 212. Thus, by depressing the lever 198 with manual pressure, the lower end thereof will raise the platform 204 and, consequently, elevate the collar 116 in securing a lens blank 10 between the pin 184 and lower edge of the dial 110.

The lens blank 10 is properly positioned in the selected lens mounting assembly 84 or 86 through the employment of the target viewing station 64. This assembly includes an optical system housed chiefly within housing 216. This optical system includes a lamp 218 which, when energized, is adapted to have its rays reflected by a pair of reflecting surfaces or mirrors 220 and 222. These rays are adapted to pass through a pair of cooperating reticles 224 and 226 and ultimately to the eye of the viewer. The reticle 224 functions as the target reticle whereas the reticle 226 functions as the scale reticle. Both reticles are formed of photographic negatives with a black background and white lines and numerals adapted to transmit the lights rays. In this connection, the master of both scales can be initially produced on an enlarged scale and then reduced to size to form the finished product. The image transmitted through the reticle 224 is then reflected by means of the reflecting surface of mirror 228 and transmitted through the magnifying lens 230 and then reflected by the reflecting surface mirror 232 from whence it passes through the lens 234 to the eye of the viewer. The image transmitted through the reticle 226 also passes through the lens 230 in superimposed relation to the image emanating from the reticle 224 and is then reflected by the mirror 232 and also passes through the lens 234 to the eye of the viewer.

All of the parts constituting the described optical system may be suitably mounted in the housing 216 by one of many known techniques typified by that illustrated in FIG. 18. With respect to the target reticle 224, however, an adjustable mounting is provided whereby the reticle 224 may be adjusted in transverse directions while in a horizontal plane. Thus, this reticle 224 may be supported by means of a plate 238 provided on its top surface with teeth 240 for purposes of acting as a rack. These teeth 240 are, in turn, adapted to mesh with the teeth of a geared portion 242 and 244 acting as a pinion. A knob 246 extends outwardly of this geared pinion whereby turning of the knob causes corresponding movement of the pinion and, consequently, the rack portion of the plate which supports the reticle 224.

The inner end of the pinion 241 extends through an accommodating bore of a bracket 243. A retaining ring 245, washers 247 and 249, together with compression spring 251 serves to assure the proper meshing of the pinion geared portion 242 and 244 with the rack portion 240 of the plate 238. In this manner, it is possible to accurately locate the optical center according to prescription by shifting the target reticle 224 relative to the scale reticle 226.

Transverse movement of the reticle 224 is accomplished by means of a second knob controlled actuator including an internally threaded tube 250 connected with the plate 238. This tube is permitted longitudinal movement relative to a boss 252 extending inwardly of the housing 216 but is not permitted relative rotational movement with respect thereto by means of the screw 254 extending into a longitudinally extending slot 256 in the tube. An externally threaded screw 258 is received by the tube 250 and, when turned, is adapted to shift the plate 238 and, consequently, the reticle 224. The outwardly projecting end of the threaded screw 258 conveniently mounts a handle 260 which facilitates the turning of the screw.

The segment 12 of the lens blank 10 is then aligned with the target reticle. To this end, a lamp assembly 270 directs a suitably intense light beam through the window 182 of the lens mounting assembly to cast an image of the segment 12 on to the reflecting surface or mirror 272 from whence it is reflected onto the mirror 232 and then reflected in such a manner that it passes along the optical center through the lens 234 to the eye of the viewer.

When the cylinder axis has been set to prescription by means of the dial 110, and the movable target reticle 224 has been displaced relative to the substantially stationary reticle 226 to locate the disposition of the segment 12 relative to the optical center and the lens blank 10 accurately located and clamped in the lens mounting assembly 84 and 86, the turntable 81 is shifted to place the mounted lens blank 10 at the plug molding station 66. An indexing unit 276 cooperates with the indexing wheel 96 keyed to the base of the shaft 88 of the turntable assembly 81. This indexing unit includes a slide lock 278 adapted to be placed in the accommodating recesses 280 of the indexing wheel 96 upon attainment of either the lens mounting position or plug molding position by the turntable assembly 81. This slide lock 278 is slideably mounted by a career 282 of the locking unit 276 and is adapted to be actuated by crank arm 284 pivotally connected with the slide and keyed to a shaft 286 also having secured thereto a lever 288 disposed on the other or upper side of the base panel 72. The slide lock 278 is adapted to be secured in the locked position through the operation of a locking pin 290 adapted to be disposed in an accommodating recess 292 in the slide 278. This pin extends from a piston 294 biased away from the slide 278 by means of a spring 296. The bias of this spring 296 is adapted to be overcome by air pressure supplied to the fitting 298. As will be explained shortly, air pressure is applied to the piston 294 as a safety precaution in assuring that the turntable cannot be unlocked while the molds 24 and 26 are lowered and in position during the molding step. The closing of the slide lock 278 also results in closing of a microswitch 300 the arm of which is adapted to be engaged by a shoulder on the crank arm 284. The extreme positions of the slide lock 278 are releasably determined by means of a spring biased plunger 302 the projecting end of which is adapted to cam against adjacent surfaces of the crank arm 284. This plunger 302, accordingly, will serve as a latch for the crank arm 284 and, consequently, the slide lock 278.

Upon completion of the clamping of the lens blank 10 in the selected lens mounting assembly 84 or 86 and unlocking of the turntable assembly 81 by the indexing unit 276, the turntable 82 is rotated 180° to place the mounted lens blank 10 at the plug molding station 66. The desired cylinder axis is set into mold 26 by rotating dial 314 to the corresponding setting. Then the mold 26 is displaced relative to the mold 24 for purposes of locating the mechanical center a prescribed distance from the optical center as defined by the center of the mold 24 and, more specifically, the center of the tubular cavity 112. Referring now to the mold 26, this mold is defined by a core having an arbor 310, shown in a retracted position in FIG. 20, and in an extended position for molding in FIG. 21. The outside shell 312 of the core is in contact and square with adjusting ring 314 when the shell 312 is in a retracted position. At this point, the key 316 extending downwardly from the adjusting ring 314 is disposed in key slot 318 formed in the shell 312. When in a retracted position of the mold core 26, a concentrically mounted compression spring 320 will be compressed further through the retaining ring 322 and bushing 324. Under this set of conditions, the spherical surface 326 at the base of the stem 328 and the mating surfaces of the bushing 330 are separated. A pin 332 is secured to the top end of the stem 328 and mounts at its ends collars 334 movable in opposed slots 336 provided in the arbor 310. When the collars 334 bottom in the associated slots 336, further retraction of arbor 310 to a predetermined position causes the tapered surfaces 338 of the die member 340 to separate from the mating tapered surfaces of the interior of the shell 312. When this occurs, the cylinder axis adjustment can be introduced by turning the dial 314 to consequently turn the shell 312 a corresponding amount without applying torque to the die member 340. In this connection, a cable 344, together with the keying means provided by the pin 332 and its mounted collars 334 in slots 336, retains the die member 340 in relatively constant radial position. The arbor 310 is also held radially by the splined connection afforded by the key and keyway arrangement 344 which does permit, however, free movement of the arbor in a vertical direction in the substantially elongated bushing or tubular member 346.

Immediately before the molding core 26 is lowered into position for molding the plug 30, the arbor 310 will be extended downwardly. The shell 312 will leave the adjusting ring 314; and the spring 320 will expand between the ring 322 and bushing 324 thereby causing the tapered surface 338 to come into contact and engage the adjacent surfaces of the shell 312. Thus, the shell 312, under these conditions, will be retained in the preset position during its movement from its retracted position until it comes into contact with the lens blank thereafter.

In FIG. 21, the mold core 26 is shown lowered into position ready for pouring of the cast plug 30. In this position, the lens blank 10 is clamped against the lower edge of the optical center mold 24 as defined by the dial 112. The shell 312 of the mechanical center mold 26 is in contact with and conforms to the spherical surface of the lens blank 10. Under these circumstances, the shell 312 will be tilted at an angle through the displacement of the mating spherical surfaces 326 and those of the bushing 330. It should be appreciated that the centers of these particular curved surfaces will be disposed approximately on the top surface of the lens blank 10. The die member 340 is maintained in constant relationship with respect to the prescribed cylinder axis that has been set by means of the dial 314. For purposes of orienting the projection 350 of the die member 340 with respect to this axis for producing a cored key slot 36 in the bottom surface of the cored cavity and the plug 30, this relationship of the die member 340 is maintained through the interengagement of the collars 334 in the accommodating slots 336, the pin 332, the member 328 and the intermediary flexible shaft 344. This mechanical combination through the contact of the die member 340 with the adjacent tapered surfaces of the shell 312 retains the shell on the prescribed cylinder axis adjustment.

When the mold 26 is in its position ready for molding the plug 30, the centerline of the shell 312 and that of the arbor 310 will pass through the same point on the lens blank 10. This results in the accurate location of the cored hole of the plug with relation to the mechanical center of the lens blank 10. The optical reference portion of the mold 24 remains fixed on a horizontal plane. This proper disposition of parts remains fixed during the casting process.

In order to locate the prescribed mechanical axis with respect to the optical axis, the mold 26 is required to be shifted. This is accomplished by shifting the plate 354 linearly in a substantially horizontal plane in substantially any direction. This plate 354 supports the arbor 310 and the remainder of the mold 26 through the tubular member 346. The shifting of the plate 354 is accomplished by means of the core axis slide assembly 356. This plate 354 is suspended by a pair of spaced parallel ball bearings 358 and 360 which are interposed between recess sides of the plate 354 and recessed rods 362 and 364 both of which are anchored to the base 70 of the blocker 60 through the casing 366. The bearings 358 and 360 serve to permit movement of the plate 354 in a horizontal plane in one direction parallel to the axis of these bearings. Predetermined displacement of the plate 354 in this direction and, consequently, the shifting of the core 26 is achieved through the operation of a dial actuated spiral gear mechanism 368. This mechanism includes a spiral gear 370 located at one end of a shaft 372 the other end of which is coupled with a dial 374. The gear 370 is threadedly engaged with mating threads of a bracket 376 secured to a plate 380 which is movable in a direction normal to the permissible movement of the plate 354 in bearings 358 and 360. The other end of the shaft 372 is journaled in a bracket 382 extending upwardly from the plate 354 through interposed ball bearing 384. A spring 386 is biased against a pair of collars 388 and 390 for purposes of tensioning the mechanism 368 and reduce to an absolute minimum any play of the parts which may affect the adjustment for locating the mechanical center. Under these circumstances, rotation of the dial 374 in a clockwise direction will result in movement of the plate 354 to the left as viewed in FIG. 23 whereas counterclockwise rotation of the dial will produce movement of the plate 354 to the right as viewed in this figure.

Linear motion of the plate 354 in a direction normal to that produced through the mechanism 368 is accomplished through the sliding movement of plate 380. This plate is suspended between recessed shafts 394 and 396 through interposed ball bearings 398 and 400, respectively. These recessed shafts 394 and 396 are anchored to the casing 366. The desired amount of movement of plate 380 is obtained through the actuation of a dial controlled spiral gear mechanism 404 the parts of which will be similarly numbered as that of mechanism 368. It should be observed, however, that the bracket 382' of mechanism 404 is anchored to the casing 366 whereas bracket 376' is anchored to the plate 380. As will be appreciated, actuation of both of the mechanisms 368 and 404 will result in a compound movement of the plate 354 and, consequently, the core 26 in substantially any direction along the horizontal plane for any desired distance determined by prescription.

The calibration of the scales appearing on the dials 374 and 374' when referenced with respect to a starting index inscribed or otherwise placed on the face of the supporting bracket 382 and 382', as the case may be, will be in terms of a particular linear displacement of the plate 384. This is determinable through knowledge of the parameters of the spiral gear 376 or 376'. Such calculations are readily determinable through employment of any well known engineering or mechanical handbook.

A cover 406 may be suitably anchored to the casing 366 to protect the operating parts of the mechanisms 368 and 404.

A core actuator in the form of an air cylinder 410 is supported by the plate 354 and is operable to automatically lower and then retract the core 26. In this connection, the air cylinder 410 conveniently mounts a reciprocal piston 412 the lower or forward face of which has extending therefrom a piston rod 414. This piston rod extends beyond the lower end of the air cylinder 410 and is coupled with arbor 310 through a cushioning means which reduces the impact forces incident to the lowering and raising of the core 26. Thus, the lower end of the piston rod 414 is keyed with a rod 416 disposed concentrically within the arbor 310. The lower end of this rod 410 is provided with an axial extending bore 418 which receives a spring 420 the other end of which is biased against shoulder 422 of the arbor 310. A retaining ring 424 limits the extent of upward travel of the rod 416 relative to the arbor 310. Under these circumstances, the spring 420 will cushion the blow or impact of the lower edge of the shell 312 when lowered and placed in contact with the lens blank 10.

The air cylinder 410 is a double acting cylinder having operating pressures on the rod side at all times and atmospheric pressures on the piston side when the piston is retracted. Operating pressures will be on the piston side when the core is extended or lowered into position. The cylinder 410, under the circumstances, operates on the differential pressure principle incident to the displacement of the piston rod cross sectional area. This provides a positive force on the piston side when both faces of the piston are subjected to identical operating pressures.

A pin 426 extends radially from the arbor 310 and is adapted to contact the arms of switches 428 and 430. The limit switch 428 is normally open and will be closed upon engagement with the pin 426 for purposes of initiating the pouring cycle for the plug 30. If there is no lens 10 under the molding core 26, the normally closed limit switch 430 will open and break the control circuit which will automatically retract the core 26 out of the molding cavity.

Upon lowering of the mold 26 onto the positioned lens blank 10 at the plug molding station 84, the molding or casting material is then poured between the cores 24 and 26 for purposes of molding the plug 30. The casting material is dispensed through a unit 68 including a container 434 which may assume the form of a commercially available dispensing pot which has a built-in thermostatically controlled heater. A discharge tube 436 is coupled with the outlet of the pot. This tube, if desirable or necessary, may include an auxiliary heater for maintaining the casting material in a molten condition. The other end of the tube 436 extends into a valve controlled pouring spout 438 adapted to be controlled through the actuation of a solenoid valve in a manner to be described shortly.

Upon completion of the molding cycle and setting of the cast plug 30, the core 26 is retracted out of the mold. The turntable assembly 81 is unlocked by actuating the indexing unit 276. In this connection, the locking lever 288 is turned to retract the slide lock 278 out of the accommodating recess 280 of the index wheel 96. The turntable assembly 81 is rotated in a counterclockwise direction until it snaps into the knockout position as determined by the engagement of the spring biased stud 100 with the surfaces of the recess 98 provided in the top surface of the index wheel 96.

In this position of the turntable assembly 81, a lens ejector assembly 440 is adapted to be manually actuated for purposes of removing the lens blank 10 having the molded plug 30 thereon from the mold 24. The ejector assembly 440 includes a bracket 442 extending from the casing 366. A rod 444 is supported by this bracket in a vertical position and is adapted to be reciprocated therein for purposes of engaging the plug 30 on the lens blank 10 for removing this assembly from the mold 24. This rod has mounted thereon a retaining ring 446. A spring 448 is biased against this ring 446 as well as an inwardly extending shoulder 450. The rod 444, under these circumstances, will be biased in an upwardly direction. A suitably retained collar 452 serves to limit the extent of vertical movement of the rod 444 by engaging the locking ring 446. The upper end of the rod 444 includes a handle 454 which may be grasped or otherwise engaged by one's finger or hand for purposes of lowering the rod 444. The other end of the rod includes a resilient cap or head 456 suitably secured thereto. This cap is adapted to engage the upper periphery of the plug 30 for purposes of freeing the plug together with attached lens blank 10 from the mold 24.

The turntable assembly 81 may now be rotated to place the lens mounting assemblies 84 and 86 at the lens mounting station and plug molding station, as the case may be. The cycle of operation of the blocker 60 may now be repeated.

In summarizing the operation of the blocker 60, particular reference is now made to the diagrammatic view of FIG. 28. The blocker is initially coupled with a suitable source of electrical energy which may, as indicated, assume the form of a 115 volt, 60 cycle single phase source with a third wire ground using a three prong receptacle and connector. The pneumatic system of the blocker is then connected with an air pressure line having a combination oiler, filter and pressure regulator. In successful applications of the blocker, the air pressure regulator was set for approximately 50 lbs. operating gauge pressure. In this particular application, a pouring timer 460 for determining the time duration during which the casing material is permitted to flow from the solenoid controlled valved pouring spout 438; this setting may be for approximately 4 seconds. A cooling timer 462 which determines the duration of the cooling cycle of the poured and molded plug 30 before the molding cores 24 and 26 are permitted to be segregated therefrom. This time may be set for approximately 40 seconds for the discussed application. The "metal" toggle switch 464 is now turned on. This switch may be of the double pole single throw variety which serves to energize the metal melting pot 434 and particularly the heaters thereof. In addition, this switch serves to energize the heaters 466 that are disposed around the metal pouring solenoid valve 430. Approximately 15 to 20 minutes would ordinarily be allowed for the metal to reach proper pouring temperatures. At that time, the normally open temperature switch 468 of the control circuit closes. The "blower" toggle switch 470 is then turned on. This switch is of double pole single throw variety, half of which energizes the blower motor 472 while the other half closes a set of contacts of the control circuit. The "viewer" toggle switch 474 is now turned on. The closing of this switch serves to energize a transformer 476 which, in turn, is adapted to energize viewer lights 218 and 270.

The turntable assembly 81 is now locked in place by shifting the lever 288 so that the slide lock 278 engages with the accommodating recess 280 to temporarily lock in place the lens mounting assemblies 84 and 86 in the position shown in FIG. 10. This closes the limit switch 300 located in the control circuit. The cylinder axis dial 110 of the turntable mold 24 is set to the prescription correction. The technician or operator then looks through the eye piece 234 of the viewer 64 for purposes of setting the movable target 224 in proper displacement of the segment 12 of the lens blank 10 from the optical center by rotating the control knobs 246 and 260. If necessary, the lens mounting assembly 86 is now adjusted for thickness of the lens blank 10 by lifting and rotating the tubular member 178 to place the pin 190 in the desired recess 192.

The particular lens blank 10 is now placed in the lens mounting assembly 86 and the clamping lever 198 to set the position of the lens blank 10 through the interengagement of the latch 126 with the appropriate flange 122. At this point, the lens blank 10 is in what may be termed a set position awaiting a fully clamped position. This occurs following the accurate location of the lens segment line with the target setting. The lever 198 is now fully depressed to clamp firmly the lens blank 10 in place.

The turntable assembly 81 is now unlocked by turning the lever 282 to retract the slide lock 278 from the accommodating recess 280. The turntable 82 is rotated counterclockwise 180° and then locked in this position by sliding the lock 278 into the neighboring recess 280. The cylinder axis dial 314 located directly above the mold 24 is set to the prescription correction. The "X" and "Y" coordinate dials 374 and 374' are turned to introduce the proper prescription displacement of mechanical center from optical center. At this time, a colored "operate" light 478 will be on. This indicates that the turntable 82 is locked in place, that the blower 472 is on and the metal in the pot 434 is up to pouring temperatures.

The "start" button 480 may now be depressed. This is normally an open momentary contact switch in the control circuit which energizes the control relay 482 which, in turn, closes a set of contacts across the start switch 480. This action also energizes a 3-way air control solenoid valve 484. The air cylinder 410, as stated, has atmospheric pressures on the piston side when the piston is retracted and operating pressures when the piston is extended. The cylinder operates on a differential pressure theory of operation due to the displacement of the piston rod cross sectional area. This provides a positive force on the piston side while both sides of the piston are subjected to operating pressures. When the operating pressure is removed on the piston face side, the differential will cause automatic retraction. The energization of the 3-way air control solenoid valve 484 switches operating air pressure to the piston side of the air cylinder 410 which, in turn, extends the core 26. If there is not a lens blank 10 under the mold, the normally closed limit switch 430 will open and break the control circuit which will, consequently, automatically retract the core 26 out of the mold. Whenever operating air pressure is applied to the piston side of the air cylinder 410, operating air pressure is also applied to the small piston safety pin 290 in the indexing unit 276. It will be recalled that this locking pin engages the slide 278 so that the turntable assembly 81 cannot be unlocked while the core 26 is in its lowered position.

In the event a lens blank 10 is properly in place under the mold 26, normally open limit switch 428 will close energizing the cooling timer 462, the metal pouring timer 460 and the two-way normally closed metal pouring solenoid vlave 430 which starts the pouring of the low melting point alloy metal into the mold cavity between the cores 24 and 26. After approximately 4 seconds pouring time, the metal pouring timer 460 is actuated thereby opening the normally closed contact 460a which de-energizes the metal pouring solenoid valve 430 to stop the metal pouring. After approximately 40 seconds cooling time, the cooling timer is actuated thereby opening the normally closed contacts 462a in the control circuit which, in turn, de-energizes the control relay 482. The relay contacts 482a across the start switch 480 will open and simultaneously the 3-way air control solenoid valve 484 will be de-energized. The piston side of the air cylinder 410 will be, accordingly, switched from operating pressure to atmospheric pressure which causes the retraction of the core 26 out of the mold.

During the cooling time, a second lens blank 10 may be properly placed and clamped in the diametrically opposed turntable lens mounting assembly 84. Any time during the pouring and cooling cycle, if the "stop" button 486 is pressed, the control circuit will be opened thereby stopping the cycle and the core 26 will be automatically retracted. In any event, the core 26 will now be retracted out of the mold. The turntable assembly 81 is unlocked by retracting the slide lock 278 by turning the lever 288; and the turntable 82 is rotated counterclockwise until the spring biased plug 100 snaps into place in the accommodating recess 98 in the top of the indexing wheel 96 to thereby locate the turntable at the ejector station. The lever 134 is pressed inwardly to unlatch the lens mounting assembly collar 116 resulting in the lowering of the pin 184. If desired, the entire lens holder mounted on the shaft 114 may be rotated 90° whereby the spring biased plug 168 will snap into a recess in the collar 116 to thereby hold the lens holder in an open position. The handle 454 of the lens ejector assembly 440 may now be plunged downwardly whereby the cap 456 will strike the upper surfaces of the molded plug 30 to remove the lens blank 10 and secured plug 30 from the mold 24. This completes the cycle of operation of the blocker 60.

The assembly of lens blank 10 and molded plug 30 is mounted in an edge grinding or contouring apparatus 500 (FIG. 29). The contouring apparatus forms an asymmetrical peripheral contour edge on the blank 10 about the ultimate mechanical center, for example, producing an edge portion of different radius 27, as shown in FIG. 6. The grinding apparatus includes an arbor 502 adapted to engage with the conical surface 34 defining the mechanical center reference. Arbor key 504 is adapted to fit into the key slot 36 which serves as a reference for the horizontal axis. The arbor 502 is mounted on a shaft 506 and the blank 10 together with plug 30 is held in the chucking arbor by means of a clamping plate 508 operated by suitable clamping means, such as air cylinder 510. Also fixed to the shaft 506 is a contour cam 512 having the asymmetrical peripheral contour configuration desired in the blank. This cam engages a plate 514 as shaft 506 is rotated by a suitable motor 516, moving the rotating blank 10 toward and away from the rotating cup-shaped edge grinding wheel 518. Thus, the desired asymmetrical contour is formed on the blank 10, reference to the horizontal axis of the finished lens.

Following this contouring operation, during which the blank is shaped to a balanced condition around the ultimate mechanical center and the size of the semi-finished blank is significantly reduced, the assembly is mounted in a conventional toric or spherical surface generating machine 520 (FIG. 31). The optical center reference surface 32, together with the key slots 38 therein, are employed in mounting and locating the blank 10 together with the molded plug 30 in the chucking means of the generator. It will be recalled that these slots 38 will also serve to relate the plug together with mounted lens to the prescribed cylinder axis angle when mounted in the generator. Therefore, when the toric surface is generated by grinding the rear surface 15 of the blank 10, the generated toric surface will be properly oriented on the blank.

The generating machine 520 includes an adaptor chucking means 522 which receives the exterior surfaces of the plug 30 such that the axis of the surface 32 coincides with the axis of the supporting member 524. The particular type of toric surface generator shown is merely exemplary and may be of a kind obtainable from Coburn Manufacturing Company of Muskogee, Okla., known as a Model 111 toric lens generator. The support 47 is mounted for movement in a line toward and away from the generating grinder wheel 526 preferably of the cup-shaped variety. The chucking means 522 includes a locating ring 528 slipped over the cast plug 30, as shown. The plug is inserted into the chuck 530 with key 532 engaged in key slot 38. Pressure from the operator's fingers is exerted at the central portion of the concave surface of the lens in the direction of the chucking means, at which time the blank 10 contacts the ring 528. The ring, in turn, contacts the chuck 530; and, under this set of conditions, the lens blank 10 is lined up with the chucking means and with relation to the generating wheel 526 so as to grind the lens blank 10 with its optical center and cylinder axis in the desired locations.

The generating grinding wheel 526 is rotated by a motor 532 which, in turn, is mounted on a sector plate 534 pivotal about pin 536 mounted on the lower plate 538. Rotation of the sector plate about pin 536 will change the angle at which the wheel 526 engages the lens blank 10. Thus, the radius of one surface generated on the blank 10 can be varied. This surface is the one extending vertically at right angles to the page when viewing FIG. 31. The lower plate 538 is carried on a slide construction 540 which, in turn, is mounted on a pivotal block 542. This block is arranged to rotate about the pin 544 and thus move the lower plate 538 and all structure carried thereon, in an arc about this point as indicated by the arrow 546. This motion sweeps the generating wheel 526 across the lens blank 10 from top to bottom of FIG. 31, thereby determining the radius of the other curve of the toric surface. The angular setting of the sector plate 534 and the location of the pivot pin 544, with reference to its spacing from the chucking means 522, are varied by suitable controls on the machine to determine the radii of the toric surface according to the prescription.

Once the toric surface is generated on the blank 10, it is ground and polished, using conventional surfacing machines. Prior to this operation, however, it may prove desirable to reduce the outer diameter of the plug 30 or, on the other hand, await the completion of the polishing operation, in order to assure that the plug 30 and particularly the outer surfaces thereof will not interfere with the final edge grinding operation. Thus, a plug reducing apparatus 550 (see FIGS. 33 and 34) is contemplated by this invention. In this connection, such plug reducing apparatus will include a central chuck 552 preferably of a heat insulating material for engaging with the conical surface 34 at the same time cooperating with the clamping plate 554 in clamping the assembly of blank 10 and plug 30 in a relatively immovable position. At this time, an outer shell 556 preferably of a superior heat conducting material is shifted forwardly to cut into the plug 30 by melting away the low melting point alloy engaged thereby. This shell 556 is heated by means of a suitable heating unit 558; and it preferably includes a series of radial ribs 560 which also cut into the low melting point alloy. This enables the outer sectors of the low melting point alloy to be removed with relative ease. A suitable means (not shown) may be interposed between the chuck 552 and the outer shell 556 whereby the permissible forward movement of the shell relative to the chuck is limited in order to prevent it from coming into direct contact with surfaces of the blank 10. It will be found that, if the outer sectors of the plug 30 do not drop away from the blank and the remaining portions of the plug 30 by themselves, they may be readily removed by merely tapping them with one's finger or other suitable tool. A lens blank 10 with the outer sectors of the plug 30 removed is shown in plan in FIG. 35.

Referring now to a conventional surfacing machine 564 (FIGS. 36 and 37), a special plug 566 may be employed for engaging with the inner conical surface 34 of the reduced plug 30. This plug 566 is adapted to be engaged by pins 568 of the surfacing machine 564. The pins extend from a cross bar 570 which is bolted to a drive arm 572. The forward end of this arm is engaged by a pressure pin 574 which, in turn, is forced downwardly by spring 576. The lens blank 10, with the generated toric surface thereon, rests upon a formed tool 578 the upper surface of which is a complementary or plus toric surface to that surface generated on the blank. These are standard types of tools, of which there may be a number kept in stock, or, if necessary, shaped to the proper surface configuration by known methods.

The surfacing plug assembly 566 includes a tapered plug 580 adapted to engage with the mechanical center reference surface 34. This assembly is positioned on the cylinder axis by engagement of key 582 with the key slot 40. It should be understood that engagement of the pins 568 in the surfacing plug assembly positions the blocked lens with its cylinder axis parallel with the cylinder axis of the surfacing lap. For this application, the outer portion of the casting is preferably removed before the surfacing work.

The tool carries on it a suitable grinding or lapping surface, and a slurry of abrasive or polishing compound may be also be introduced by known means. Arm 572 is driven in such a manner that pins 568 move over form 578 in an irregular manner, to avoid introduction of any deviation in the toric surface by repeated contact between the same areas of the form and the surface generated on the block. By performing the grinding and polishing steps in this manner, the desired surface is ground and polished about the mechanical center, and in a balanced condition, recalling that the blank was contoured about the ultimate mechanical center, thus assuring accuracy of cylinder axis and avoiding unequal glass removal during the smoothing grinding operation which could result in an undesirable shift in the position of the optical center.

In FIG. 38, the general arrangement of a suitable and conventional final edging apparatus is illustrated. The operation of this machine is somewhat similar to that of the contouring tool previously described and shown in FIG. 29. In this connection, the blank 10 is gripped between an axially fixed chucking means 590 and an axially movable clamping member 592 which can be reciprocated by an air cylinder, a portion of which is shown at 594. The clamping member 592 may be provided with a resilient means or be padded to facilitate the clamping operation without damaging the lens blank 10. On the other hand, the chucking device 590 includes a plug portion 596 provided with a key 598 adapted to mate with the key slot 36 of the reduced plug 30. Shaft 600 is rotated by a suitable drive motor (not shown) and this shaft carries a final contour cam 602 which operates against a plate or the like 604, including a switch for controlling the rotation of shaft 600 to move the entire assembly of jaws, shaft and cam, including the blank, toward and away from the rotating finished edge grinder 606. The wheel of this grinder is dressed to form the proper bevel edge on the finished lens, and, of course, by means of this apparatus, the ultimate contour is formed on the finished lens about the mechanical center, and the lens is thereby prepared to be mounted in a receptacle frame of predetermined dimensions.

As an alternative means of surfacing, to be used if the outer portion of the cast plug 30 has not previously been removed as described herein, a special plug 610 (see FIGS. 39 and 40) may be inserted into the conical cavity 34 of the plug 30. The toric lens surfacing plug 610 is assembled with the plug 30 such that its key 612 engages in key slot 40 provided in the plug. Two pins 614 on the surfacing machine engage in holes 616 of the plug which are located in the same meridian as the cylinder axis positioning key 612. Under this set of conditions, the cylinder axis of the lens and the cylinder axis of the smoothing and polishing laps are maintained parallel one with the other.

A special plug is shown in FIGS. 41 and 42 which fits the cavity 34 in the plug 30 and holds the lens 10 suitably for processing in a sphere surfacing machine in the event the outer portion of the plug has not previously been removed. Sphere lens surfacing plug 620 is assembled with the plug 30 and lens 10. With pin 622 engaged in hardened insert 624, the blocked lens 10 rotates about its mechanical center during surfacing.

It will now be appreciated that the whole or partially remaining plug 30 is no longer required after the foregoing procedure has been completed. The plug 30 may now be removed in a suitable manner. In the case of the low melting alloy materials previously mentioned, this may be done by applying heat or by immersing the assembly in sufficiently hot water or other suitable liquid, thereby freeing the polished blank from the plug.

The present invention, therefore, provides a novel method of preparing ophethalmic lenses according to prescription, in which accuracy of alignment of the optical surface is assured and maintained and by which method the finished lens can be obtained with the use of a minimum of skilled technical operators. Furthermore, the method assures continuity of alignment throughout the processing of the lens blank, and avoids the edge cutting operation now customarily performed on the blank after the toric surface has been generated and finished. The optical surfaces ground or otherwise generated on a blank of reduced size, with consequent savings in time required for generating and in wear of the generator grinding wheel, and the same economies of time and materials carrying through the subsequent grinding, polishing, and edging operations. As noted, the finishing operations on the toric surface, grinding and polishing, are performed with pressure exerted on the blank which is balanced throughout the ultimate mechanical center of the finished lens, thereby maintaining, during these subsequent operations, the optical center in the same position in which it was located during generating.

The blocker of this invention enables an unskilled operator to quickly locate and secure a referencing plug or cast to the lens blank in precise alignment according to the prescription and in which a minimum exercise of discretion is required in the alignment operation. Thus, the blocker assures precise control of the required geometrical properties of the finished lens.

It should, therefore, be apparent to those skilled in the art that the present invention offers the following exemplary advantages. There is no layout nor marking up of the lens blank. Optimum precision blocking is achieved through the use of mechanical positioning rather than the heretofore manually applied ink marks. Optical sighting through the optical system of the blocker provides increased accuracy over visual alignment of a segment mark. One low melting point alloy cast block provides all required references. There is no separate metal block to handle and clean and no second block to attach for edging.

As a result of this invention, there is also:

(1) A minimum practical size blank to be generated, surfaced and edged.
(2) All blanks are the same size for surfacing.
(3) Area of the blank is precisely balanced about the mechanical center.
(4) There is no need to cut the lens before edging to remove excess glass.
(5) There is no marking of the lens blank for edging nor need there be interim cleaning of the blank.
(6) The plug serves to hold the uncut lens on axis without slippage even under pressures of high speed edging.
(7) Finally, the blocked lens engages the edger chuck directly and there is no time lost inserting the lens in a centering attachment.

Other advantages and objects of the present method will be apparent to those skilled in the art.

While the methods herein described constitute preferred embodiments of the invention, it is to be understood that the invention is not limited to these precise methods, and that changes may be made therein without departing from the scope of the invention which is defined in the appended claims.

We claim:

1. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, attaching in one casting operation a single cast plug to the finished surface of the semi-finished blank having a surface aligned with the ultimate mechanical center and an optical center reference surface aligned with the ultimate optical center and a horizontal alignment surface referenced according to the ultimate horizontal alignment of the finished lens, forming the prescribed optical surface on the unfinished side of the lens blank with reference to the plug surface previously related to the ultimate optical center, and employing the single cast plug to form on the blank the final edge contour of the finished lens with respect to the mechanical center and the required horizontal alignment of the lens.

2. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, attaching in one casting operation a plug to the finished surface of the semi-finished blank having a mechanical center reference surface aligned with the ultimate mechanical center and an optical center reference surface aligned with the ultimate optical center and a horizontal alignment reference surface referenced according to the ultimate horizontal alignment of the finished lens, reducing the size of the semi-finished blank by removing material from predetermined portions of the periphery of the blank to form a reduced lens blank, forming the prescribed optical surface on the unfinished side of the reduced lens blank with reference to the optical center reference surface related to the ultimate optical center, finishing the thus formed prescribed optical surface, and then forming on the reduced blank the final edge contour of the finished lens with respect to the mechanical center and the required horizontal alignment of the lens.

3. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, attaching in one casting operation a plug to the finished surface of the semi-finished blank having a mechanical center reference surface aligned with the ultimate mechanical center and an optical center reference surface aligned with the ultimate optical center and a horizontal alignment surface referenced according to the ultimate horizontal alignment of the finished lens, reducing the size of the semi-finished blank by removing material from predetermined portions of the periphery of the blank to form a reduced lens blank, forming the prescribed optical surface on the unfinished side of the reduced lens blank with reference to the optical center reference previously related to the ultimate optical center, finishing the thus formed prescribed optical surface, reducing the size of the plug by removing material from predetermined portions of the periphery thereof, and then forming on the reduced blank the final edge contour of the finished lens with respect to the mechanical center and the required horizontal alignment of the lens.

4. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, attaching in one casting operation a plug to the finished surface of the semi-finished blank having a mechanical center reference surface aligned with the ultimate mechanical center and an optical center reference surface aligned with the ultimate optical center and a horizontal alignment reference surface referenced according to the ultimate horizontal alignment of the finished lens and a cylinder axis reference surface referenced according to the prescribed cylinder axis, forming the prescribed optical surface on the unfinished side of the lens blank with reference to the optical reference surface previously related to the ultimate optical center while controlling the orientation of the cylinder axis with reference to the cylinder axis reference surface, and forming the final edge contour of the finished lens with respect to the mechanical center and horizontal axis by employing the mechanical center and horizontal axis reference provided on the plug.

5. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, molding in one molding operation a referencing plug directly to the finished surface of the semi-finished blank having a mechanical center reference surface aligned with the ultimate mechanical center and an optical center reference surface aligned with the ultimate optical center and a horizontal alignment surface referenced according to the ultimate horizontal alignment of the finished lens, forming the prescribed optical surface on the unfinished side of the lens blank with reference to the optical center reference surface on the plug previously related to the ultimate optical center, and forming on the blank the final edge contour of the finished lens with respect to the mechanical center and the required horizontal alignment of the lens by employing the mechanical center and horizontal alignment reference provided on the plug.

6. The invention in accordance with claim 5 wherein said referencing plug is formed with a substantially cylindrical outer surface that provides the optical center reference aligned with the ultimate optical center.

7. The invention in accordance with claim 5 wherein the referencing plug is formed with an inner conical surface providing the mechanical center reference aligned with the ultimate mechanical center.

8. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, molding in one molding operation a referencing plug directly to the finished surface of the semi-finished blank having a mechanical center reference surface aligned with the ultimate mechanical center and an optical center reference surface aligned with the ultimate optical center and a horizontal alignment surface referenced according to the ultimate horizontal alignment of the finished lens, employing a first die member for forming the optical center reference surface and a second die for forming the mechanical center reference surface of the plug, rotatably adjusting each of said dies relative to said blank prior to molding in accordance with the prescribed cylinder axis for the finished lens, forming the prescribed optical surface on the unfinished side of the lens blank with reference to the optical center reference surface previously related to the ultimate optical center, and forming on the blank the final edge contour of the finished lens with respect to the mechanical center and the required horizontal alignment of the lens by employing the mechanical center and horizontal alignment reference provided on the plug.

9. A method of producing an ophthalmic lens according to prescribed dimensional relations, comprising the steps of supporting a semi-finished lens blank in a predetermined position with its finished side facing upwardly and being disposed above its unfinished side which faces downwardly, said semi-finished lens blank having a finished surface and an unfinished side, relating the horizontal alignment and centering of the finished lens to be formed from the blank to the finished surface of the blank, determining the location of the ultimtae mechanical center of the finished lens and of the ultimate optical center of the finished lens on said blank in such position, positioning dies on said blank with each die having an axis, the axes of said dies containing said ultimate mechanical center and said ultimate optical center of the blank, rotatably adjusting said dies about their axes and relative to said blank in accordance with the prescribed cylinder axis for the finished lens, introducing molding material between said dies for adherence to the finished surface of the semi-finished blank for forming in one molding operation a plug having a mechanical center reference surface and an optical center reference surface, removing said dies following setting of the molding material and adherence thereof to the finished surface of the blank, forming the prescribed optical surface on the unfinished side of the lens blank with reference to the optical center reference surface on the plug previously related to the ultimate optical center, and then forming the final edge contour of the finished lens with reference to the mechanical center reference surface on the plug.

10. The invention in accordance with claim 9 wherein one of the dies presents a surface for forming an index on the plug related to the ultimate horizontal alignment of the finished lens and said index being employed to obtain proper relation of the final contour of the edge of the finished lens to the cylinder axis.

11. A method of producing an ophthalmic lens according to prescribed dimensional relations, comprising the steps of supporting a semi-finished lens blank in a predetermined position, said semi-finished lens blank having a finished surface and an unfinished side, determining the location of the ultimate mechanical center of the finished lens and of the ultimate optical center of the finished lens on said blank in such position, positioning dies on said blank with each die having an axis, the axes of said dies containing said ultimate mechanical center and said ultimate optical center of the blank, rotatably adjusting said dies about their axes and relative to said blank in accordance with the prescribed cylinder axis for the finished lens, introducing molding material between said dies for adherence to the finished surface of the semi-finished blank for forming in one molding operation a plug having a mechanical center reference surface and an optical center reference surface, one of the dies presenting a surface for forming an index on the plug related to the ultimate horizontal alignment of the finished lens, removing said dies following setting of the molding material and adherence thereof to the finished surface of the blank, forming the prescribed optical surface on the unfinished side of the lens blank with reference to the optical center reference surface on the plug previously related to the ultimate optical center, and then forming the final edge contour of the finished lens with reference to the mechanical center reference surface and the horizontal alignment index on the plug.

12. The invention in accordance with claim 1 wherein the semi-finished lens blank has a lens segment on the finished side thereof and at a predetermined location thereon; and prior to supporting the semi-finished lens blank in said predetermined position, forming edge referencing means on the blank referenced to the lens segment and, thusly, the horizontal alignment of the finished lens as determined by the blank segment.

13. The invention in accordance with claim 12 wherein the distance of the edge referencing means on the blank from the lens segment is controlled to facilitate orientation of the blank relative to the optical center.

References Cited

UNITED STATES PATENTS

| | | | |
|---|---|---|---|
| 3,049,766 | 8/1962 | Buckminster | 22—58 |
| 3,118,198 | 1/1964 | Prunier | 51—277 X |
| 3,152,427 | 10/1964 | Prunier | 51—277 |
| 3,049,766 | 8/1962 | Buckminster | 22—58 |
| 3,226,887 | 1/1966 | Rudd et al. | 51—277 |
| 3,237,349 | 3/1966 | Faas et al. | 51—284 |

LESTER M. SWINGLE, *Primary Examiner.*

U.S. Cl. X.R.
51—277; 164—112.